(12) United States Patent
 Kennedy

(10) Patent No.: US 10,015,169 B2
(45) Date of Patent: Jul. 3, 2018

(54) NODE-BASED POLICY-ENFORCEMENT ACROSS MIXED MEDIA, MIXED-COMMUNICATIONS MODALITIES AND EXTENSIBLE TO CLOUD COMPUTING SUCH AS SOA

(75) Inventor: Kevin J. Kennedy, Spring Lake, NJ (US)

(73) Assignee: Avaya Inc., Basking Ridge, NJ (US)

( * ) Notice: Subject to any disclaimer, the term of this patent is extended or adjusted under 35 U.S.C. 154(b) by 366 days.

(21) Appl. No.: 13/030,537

(22) Filed: Feb. 18, 2011

(65) Prior Publication Data

US 2011/0209194 A1 Aug. 25, 2011

Related U.S. Application Data

(60) Provisional application No. 61/306,685, filed on Feb. 22, 2010.

(51) Int. Cl.
| | |
|---|---|
| *H04L 29/06* | (2006.01) |
| *G06F 21/12* | (2013.01) |
| *G06F 21/57* | (2013.01) |
| *G06F 21/60* | (2013.01) |
| *G06F 21/10* | (2013.01) |
| *G06F 21/44* | (2013.01) |
| *G06F 21/55* | (2013.01) |
| *G06Q 30/02* | (2012.01) |
| *H04L 29/08* | (2006.01) |

(52) U.S. Cl.
CPC ............ *H04L 63/102* (2013.01); *G06F 21/10* (2013.01); *G06F 21/121* (2013.01); *G06F 21/44* (2013.01); *G06F 21/55* (2013.01); *G06F 21/577* (2013.01); *G06F 21/60* (2013.01); *G06Q 30/02* (2013.01); *H04L 63/0807* (2013.01); *H04L 63/101* (2013.01); *H04L 63/105* (2013.01); *H04L 63/20* (2013.01); *H04L 67/02* (2013.01)

(58) Field of Classification Search
CPC ..... H04L 63/20; H04L 63/102; H04L 63/101; H04L 63/105; H04L 63/0807; G06F 21/55; G06F 21/577; G06F 21/10; G06F 21/121; G06F 21/44; G06F 21/60
USPC .................................................. 726/1, 4, 26
See application file for complete search history.

(56) References Cited

U.S. PATENT DOCUMENTS

| | | | |
|---|---|---|---|
| 5,787,409 A | 7/1998 | Seiffert et al. | |
| 6,578,076 B1 * | 6/2003 | Putzolu .................... | 709/223 |
| 6,611,864 B2 * | 8/2003 | Putzolu et al. ............... | 709/223 |
| 7,668,857 B2 | 2/2010 | Cook et al. | |
| 8,041,825 B2 * | 10/2011 | Gibbs et al. .................. | 709/229 |
| 8,095,670 B2 | 1/2012 | Brown et al. | |
| 8,230,478 B2 | 7/2012 | Bennett et al. | |
| 8,250,628 B2 | 8/2012 | Brodfuehrer et al. | |
| 2004/0039803 A1 | 2/2004 | Law | |
| 2004/0049698 A1 | 3/2004 | Ott et al. | |

(Continued)

OTHER PUBLICATIONS

Messerges, Thomas S., and Ezzat A. Dabbish. "Digital rights management in a 3G mobile phone and beyond." Proceedings of the 3rd ACM workshop on Digital Rights Management. ACM, 2003. pp. 27-38.*

(Continued)

*Primary Examiner* — Kari Schmidt
(74) *Attorney, Agent, or Firm* — Sheridan Ross P.C.

(57) ABSTRACT

A system and method are provided to monitor and prevent potential enterprise policy and/or rule violations by subscribers.

20 Claims, 7 Drawing Sheets

(56) References Cited

U.S. PATENT DOCUMENTS

| | | |
|---|---|---|
| 2006/0047725 A1 | 3/2006 | Bramson |
| 2006/0075222 A1* | 4/2006 | Moloney ............ H04L 63/0823 |
| | | 713/156 |
| 2006/0089938 A1* | 4/2006 | Leonard et al. .............. 707/100 |
| 2006/0120526 A1 | 6/2006 | Boucher et al. |
| 2006/0136986 A1 | 6/2006 | Doolittle |
| 2006/0161990 A1 | 7/2006 | Frey et al. |
| 2006/0218149 A1* | 9/2006 | Patrick ................ G06F 21/6218 |
| 2006/0248082 A1 | 11/2006 | Raikar et al. |
| 2006/0248573 A1* | 11/2006 | Pannu et al. ...................... 726/1 |
| 2007/0107059 A1 | 5/2007 | Chasin et al. |
| 2007/0136397 A1* | 6/2007 | Pragada et al. ............... 707/204 |
| 2007/0183342 A1* | 8/2007 | Wong ............... H04L 29/06027 |
| | | 370/252 |
| 2007/0261101 A1* | 11/2007 | Thapliyal ................ H04L 63/08 |
| | | 726/2 |
| 2007/0294410 A1* | 12/2007 | Pandya et al. ................. 709/226 |
| 2008/0034217 A1* | 2/2008 | McQuaide ............ H04B 1/202 |
| | | 713/186 |
| 2008/0059474 A1 | 3/2008 | Lim |
| 2008/0066181 A1* | 3/2008 | Haveson ............ H04N 21/4788 |
| | | 726/26 |
| 2008/0081579 A1* | 4/2008 | Chen ........................ H04W 4/00 |
| | | 455/187.1 |
| 2008/0085702 A1* | 4/2008 | Park et al. ................. 455/422.1 |
| 2008/0140759 A1 | 6/2008 | Conner et al. |
| 2008/0140760 A1 | 6/2008 | Conner et al. |
| 2008/0140776 A1 | 6/2008 | Horvitz |
| 2008/0178001 A1* | 7/2008 | Kim ........................ G06F 21/10 |
| | | 713/167 |
| 2008/0229388 A1 | 9/2008 | Maes |
| 2008/0263629 A1* | 10/2008 | Anderson ............ H04L 9/0894 |
| | | 726/2 |
| 2008/0301756 A1 | 12/2008 | Demarest et al. |
| 2009/0037594 A1 | 2/2009 | Sever et al. |
| 2009/0055888 A1 | 2/2009 | Little |
| 2009/0138506 A1* | 5/2009 | Van Riel .................... 707/104.1 |
| 2009/0172774 A1 | 7/2009 | Koti et al. |
| 2009/0216859 A1* | 8/2009 | Dolling ................. G06Q 30/02 |
| | | 709/218 |
| 2009/0288164 A1 | 11/2009 | Adelstein et al. |
| 2010/0037088 A1 | 2/2010 | Krivopaltsev et al. |
| 2010/0042701 A1* | 2/2010 | Cole .................... G06Q 10/083 |
| | | 709/217 |
| 2010/0056105 A1 | 3/2010 | Erhart et al. |
| 2010/0064341 A1 | 3/2010 | Aldera |
| 2010/0082977 A1 | 4/2010 | Boyle et al. |
| 2010/0106655 A1 | 4/2010 | Schneider |
| 2010/0115575 A1 | 5/2010 | Yu |
| 2011/0093916 A1 | 4/2011 | Lang et al. |
| 2011/0099602 A1 | 4/2011 | Apparao et al. |
| 2011/0107436 A1 | 5/2011 | Cholas et al. |
| 2011/0154435 A1* | 6/2011 | Fot et al. .......................... 726/1 |
| 2011/0184901 A1 | 7/2011 | Lommock et al. |
| 2011/0209193 A1 | 8/2011 | Kennedy |
| 2011/0209195 A1 | 8/2011 | Kennedy |
| 2011/0209196 A1 | 8/2011 | Kennedy |
| 2011/0225426 A1 | 9/2011 | Agarwal et al. |
| 2012/0192258 A1* | 7/2012 | Spencer ................ H04W 12/06 |
| | | 726/7 |
| 2012/0227082 A1 | 9/2012 | Fot et al. |
| 2013/0073473 A1* | 3/2013 | Heath .................... G06Q 30/02 |
| | | 705/319 |

OTHER PUBLICATIONS

Yu Zheng, Dake He, Hongxia Wang and Xiaohu Tang, "Secure DRM scheme for future mobile networks based on trusted mobile platform," Proceedings. 2005 International Conference on Wireless Communications, Networking and Mobile Computing, 2005., 2005, pp. 1164-1167.*

SOPHOS "SafeGuard Configuration Protection" Version 5.40 information sheet—undated, 2 pages.

SOPHOS "SafeGuard Data Exchange" Version 5.40 information sheet—undated, 2 pages.

SOPHOS "SafeGuard Management Center" Version 5.40 information sheet—undated, 2 pages.

SOPHOS "SafeGuard Partner Connect" Version 5.40 information sheet—undated, 2 pages.

SOPHOS "SafeGuard Device Encryption" Version 5.40 information sheet—undated, 2 pages.

SOPHOS "SafeGuard Enterprise—Your central key for data protection" information sheet—undated, 2 pages.

SOPHOS "SafeGuard Enterprise—Whats new in SafeGuard Enterprise 5.40" information sheet—undated, 2 pages.

"Federation (information technology)" from Wikipedia, printed Nov. 18, 2010, 2 pages.

"Virtual private network" from Wikipedia, printed Nov. 18, 2010, 8 pages.

"Service-oriented architecture" from Wikipedia, printed Nov. 18, 2010, 20 pages.

Kolb, J., "Google's Ingenious Wave Security Model," at http://jasonkolb.com/weblog/2009/09/googles-ingenious-wave-security-model.html, Sep. 15, 2009, 1 page.

* cited by examiner

NODE-BASED POLICY-ENFORCEMENT ACROSS MIXED MEDIA, MIXED-COMMUNICATIONS MODALITIES AND EXTENSIBLE TO CLOUD COMPUTING SUCH AS SOA

CROSS REFERENCE TO RELATED APPLICATION

The present application claims the benefits of U.S. Provisional Application Ser. No. 61/306,685, filed Feb. 22, 2010, of the same title, which is incorporated herein by this reference in its entirety.

FIELD

The disclosure relates generally to enterprise networks and particularly to automated policy creation, monitoring, tracking, enforcement, and remediation of policy violations.

BACKGROUND

Control of sensitive communications traffic, files, and other content is a well-known problem. There are many products that address a portion of the problem. A completely secure, fully extensible solution is not known and may never be available. This is due to photographic, paper copy, word-of-mouth, and other difficult-to-control information distribution mechanisms.

Virtual Private Networks ("VPN") provide communications among a restricted group via a logical overlay on top of an existing network. Tunnels, or secure links between nodes of the VPN, are created through the underlying network. While VPNs can make use of authentication and encryption, such features are not a mandatory part of such a system.

Two major variations on the VPN theme exist. A "Secure VPN" limits access to communications among the restricted group with positive authentication and file encryption using such protocols as Internet Protocol Security ("IPSec"), Point-to-Point Tunneling Protocol ("PPTP"), and Secure Sockets Layer ("SSL"). Secure VPNs are the defecto standard for off-site communications for enterprises and other organizations who need security features while using the internet. The other form of VPN is the "Trusted VPN", which typically guarantees a certain Quality of Service ("QoS"). Protocols for trusted VPNs include, but are not limited to Asynchronous Transfer Mode ("ATM"), Frame Relay, and MultiProtocol Label Switching ("MPLS"). Secure VPNs do not address communication and attachment distribution, access control, use, tracking, controlled external release of certain information, or timed distribution with consideration of other temporal events. Secure VPNs do not extend easily to parties outside of the VPN trust circle (external to the firewall) without incurring additional security risks. VPNs do not consider the nature of threats or information leaks that are specific to, and unique among, certain modes or media of communications. Further, VPNs do not apply to all forms of communications.

Document control systems seek to provide a single source document depository with change management and version control. Some of the documents are available only to a controlled audience within an enterprise firewall, while others are available to all enterprise business associates, and still others may be publicly available. Such a system helps substantially with documentation compliance issues, but falls short of helping with the overall control of sensitive communications traffic and content within a controlled group because it is not extensible to communications traffic. Further, there is no tracking of documents once copied from the document control system.

There are companies dedicated to Data Loss Protection ("DLP"), like Sophos (Ultimaco). Sophos offers an enterprise wide security system called SafeGuard Enterprise 5.40™ featuring DLP, device encryption (including removable media), data exchange, configuration protection, partner connection capabilities, file sharing, and remote worker encrypted data access and sharing, all configured around a centralized management center hub that can do role-based policy enforcement, centralized management, and data reporting. Sophos also offers LANCrypt™ that allows the extension of confidential data protection to file servers and network shares. Sophos offers these capabilities by loading software on mobile and stationary devices and running encryption on all files contained on such devices. Therefore, it is essentially an end-point or device-based data security system that can be extended to servers and email via additional software products. It has the disadvantage associated with full encryption, namely a substantial processing burden added to the entire enterprise. It has the advantage that it integrates with industry leading Operating System/Personal Computer ("OS/PC") security features such as Microsoft ("MS") Windows Vista™ and Win7 BitLocker™ drive encryption or Lenovo ThinkVantage™ security. Sophos also has secure storage, exchange and recovery of encrypted data across mixed device and operating system environments through superior key management. Sophos offers SafeGuard PrivateCrypto™ functionality, which allows secure file and email attachment exchange with company user groups without requiring additional passwords.

While the Sophos suite of security features is the industry leading package, it has significant overhead in terms of the time required to load the software, encrypt the files, and manage all of the end points. It is not easily extensible to Service-Oriented Archectures ("SOA") and the emerging standards there. It is designed more for external threat management (enterprise penetration and malware introduction) and device loss than it is for a coordinated, secure, policy-based communications environment application with mixed media and the full gamut of collaboration mechanisms. It also falls short of a full enterprise security application by not covering all forms of voice and video, social networks, blogs/microblogs, and other non email-based communications. Therefore, while it is a powerful suite of products, it does not provide a system that is secure when all communications media, modalities and architectures are fully considered. Finally, it does not integrate with existing document control systems and voice encryption systems.

Real time and packet-based voice communications security systems are also known. They require either proprietary hardware or software installation. Some are half-duplex and others are full duplex. They can apply to wire line Public Switch Telephone Network ("PSTN"), to wireless PSTN, or radio-based standards. Some apply to real time (Time Division Multiplexing ("TDM") or other modulation schemes), while others apply to Voice over Internet Protocol ("VoIP") and other non-real time voice. None of the publicly available systems audit and track such communication sessions or positively authenticate all parties in a complex real time session, such as a conference call with multiple locations and multiple parties at each location. No known voice encryption system coordinates with other security products to enforce overall communications security.

Service-oriented architecture ("SOA") allow different ways to develop applications by combining services. The main premise of SOA is to erase application boundaries and technology differences. As applications are opened up, however, security becomes an issue. Traditionally, security models have been hardcoded into applications, and, when the capabilities of an application are opened up for use by other applications, the security models built into each application may not be good enough. Several emerging technologies and standards attempt to address different aspects of the problem of security in SOA. Standards such as Web Service Security ("WS-Security"), Security Assertion Markup Language ("SAML"), Web Service Trust ("WS-Trust"), Web Service-SecureConversation and Web Service SecurityPolicy focus on the security and identity management aspects of SOA implementations that use web services. Technologies such as the Virtual Organization in Grid Computing, Application-oriented networking ("AON") and extensible markup language ("XML") gateways address the problem of SOA security in the larger context as well.

XML Gateways are hardware or software-based solutions for enforcing identity and security for Simple Object Access Protocol ("SOAP"), XML, and Representation State Transfer ("REST") based web services, usually at the network perimeter. An XML gateway is a dedicated application, which allows for a more centralized approach to security and identity enforcement similar to how a protocol firewall is deployed at the perimeter of a network for centralized access control at the connection and port levels.

XML Gateway SOA Security features include Private Key Infrastructure ("PKI"), Digital Signature, Encryption, XML Schema Validation, Antivirus, and Pattern Recognition. Regulatory certification for XML gateway security features are provided by Federal Information Processing Standard ("FIPS") and Department of Defense ("DoD"). While issues specific to SOA security are being considered and proposed as standards, there is no proposal for integration of such protocols and standards into the overall fabric of communications security or rationalizing the differences required of SOA when one considers the full gamut of media, mode, venue and the like.

When one considers the security implications of advanced communications and collaboration paradigms such as Google Wave™, the overall security problem becomes even more complex. The reason for this is that Wave users can attach documents where some may be protected and others are not. All such attachments are made available to the members of the Wave. Google Wave enforces security via an invite or participatory paradigm where the act of adding a party to a Wave or Wavelet authorizes that party to have access to, and contribute to, the contents therein. By nature of an invite or participatory security system, one creates disconnects with other security systems that are administrative or control-based. In addition, Google Wave provides little protection against the participants not adhering to enterprise or other organizational security guidelines. As a result, Google Wave presents another disjointed and incompatible security system that is not under current centralized control.

SUMMARY

These and other needs are addressed by the various aspects, embodiments, and/or configurations of the present disclosure. The present disclosure relates to policy compliance monitoring and/or enforcement, particularly in enterprise networks.

In one embodiment, an enterprise network has a plurality of subscribers, a plurality of nodes, and a policy enforcement server to enforce polices and/or rules of an enterprise corresponding to the enterprise network. Each node includes a respective policy agent to monitor and/or track behavior of the corresponding node and/or a subscriber associated with the corresponding node. A first policy agent of the plurality of policy agents corresponds to a first node and first subscriber and identifies a behavioral instance potentially relevant to a policy and/or rule. The first policy agent notifies the policy enforcement server of the determined behavioral instance, and the policy enforcement server applies a policy and/or rule to the determined behavioral instance, whereby a policy measure is implemented.

In one configuration, the behavioral instance is the first subscriber intending to make one or more of a selected communication and content accessible to one or more selected parties. In response, the policy enforcement server performs the sub-operations of:

receiving a policy tag respecting one or more of the selected communication and content;

determining, based on the policy tag, an applicable policy and/or rule; and determining, based on the applicable policy and/or rule, a policy measure to be implemented.

The policy tag can include a variety of differing types of information. For example, the policy tag can include one or more of the following:

a persona and/or role of the first subscriber, a persona and/or role of one or more selected parties, a degree of trust of the enterprise network with one or more selected parties, a capability, provisioning, and/or preference of a communication device of the first subscriber and/or one or more selected parties, a context of the first subscriber and/or one or more selected parties, a context of the communication device of the first subscriber and/or one or more selected parties, an existing policy compliance measure selected by the first subscriber for one or more of the selected communication and content, a venue for one or more of the selected communication and content to be made accessible to the one or more selected parties, a description of one or more of the selected communication and content, a context of one or more of the selected communication and/or content, and a policy and/or rule relevant to one or more of the selected communication and content.

In another embodiment, a communication node includes:

a policy agent, in a driver, to search, analyze, and/or tag one or more of a selected communication and content to identify an actual or potential policy and/or rule violation and report the actual or potential policy and/or rule violation to a policy enforcement server.

In one configuration, the policy agent is in a class driver.

In one configuration, the policy agent inspects a plurality of emails, instant messages, live voice communications, voice messages, electronic documents, and Web browsing sessions, and generates a policy tag associated with one or more of the selected communication and content.

The policy agent can implement a policy measure, typically received from the policy enforcement server, to address an actual or potential policy or rule violation. The policy measure commonly includes one or more of the following:

modification of an existing security measure for one or more of the selected communication and/or content, implementation of a new and/or additional security measure for the selected communication and content, use of a different network path and/or channel than currently chosen to effect transmission or transfer of one or more of the selected communication and content, block, delay, and/or buffer the one or more of the selected communication and content, embed a flag indicating an area of redundant and processor intensive encryption or security transcoding, prevent access of one or more of the selected communication and content by one or more selected parties, prevent a subscriber from selecting the selected content into a communication, provide read-only access to one or more of the selected communication and content, set a hop restriction on one or more of the selected communication and content whereby, when the hop restriction is met or exceeded and/or a hop counter is incremented or decremented to a selected value, the one or more of the selected communication and content is dropped or otherwise prohibited from delivery to an intended recipient, tear down a communication channel before transmission of one or more of the selected communication and content, redirect one or more of the selected communication and content to a different destination, and display different portions of one or more of the selected communication and content to different selected parties based on a respective degree of trust or privilege of each party.

The disclosed aspects, embodiments, and/or configurations can provide overall policy and rule compliance monitoring and enforcement, particularly communications security control for both the telephony and computing worlds. The overall communications security control could be a single processor complex or a combination of existing processors working together using suitable protocols, such as XML, SIP and others. It could be made up of centralized, hierarchical, or distributed equivalent nodes. This can be done with security federation by forming trusted computing groups for multiple domains (logical or physical), each having different security requirements or parameters. Federation requires a common language to describe the features and the ability to either process the communications for the network, application, or architecture or, alternatively, allow the sender to do this via input during composition of the selected communication and/or content.

The policy enforcement server can detect and rationalize (via policy and security transcoding) previously incompatible security schemes, such as those for SOA, Google Wave™, and others. The policy enforcement server would know, by enterprise structure or federation, the security method of the underlying network, application or architecture. Based on a number of factors, such as network boundary traversal and the identities of the sender and the recipient(s), the policy enforcement server can determine whether encryption, deletion (of the communication and/or select attachments), avoidance of redundant security transcoding, or other action is required.

The present disclosure can provide a number of other advantages depending on the particular aspect, embodiment, and/or configuration. For example, the policy enforcement server can address communication and attachment distribution, access control, use, tracking, controlled external release of certain information, and timed distribution with consideration of other temporal events. The security mechanisms can extend readily to parties outside of the VPN trust circle (external to the firewall) without incurring additional security risks. The policy enforcement server can consider the nature of threats or information leaks that are specific to, and unique among, certain modes or media of communications. The policy enforcement server can sense and evaluate the nature of the threat and forward broadcast announcements in the format, via the best media, and based on the user's presence and location to alert the user. For example, if a threat is detected in the email server(s) and a particular user is detected via presence at a mobile phone, a call to that mobile phone number may allow the user to react and take the appropriate actions with regard to their email prior to being impacted by the threat.

These and yet other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "application", "application program", and "software application" refer to software that is used for business or entertainment. The terms refer to virtually any type of program, including spreadsheets such as Excel™, word processors such as Word™, communication modules such as Avaya Softphone™, instant messaging platforms, and e-mail platforms, personal information managers, media players such as iTunes™, Web browsers such as Internet Explorer™, and virtual reality games such as Second Life™. However, the term generally excludes essential control software such as the operating system.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "call log" refers to a collection, or list, of inbound and/or outbound calls. A call is typically described by timestamp (e.g., date and time of day of call set up, termination, or receipt), call duration, called number, calling number, callee identity, and/or caller identity.

A "class driver" is a type of driver that can operate a large number of different devices of a broadly similar type. For example, it can be a base or ancestor class for specific drivers which need to have slightly different or extended functionality but which can take advantage of the majority of the functionality provided by the class driver.

The phrase "communication mode" or "communication modality" refers to a particular way of communicating. For example, E-mail is a first communication mode; instant messaging a second; digital voice a third; Voice over IP a fourth; facsimile a fifth; and tweeting a sixth.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The term "computer security" refers to ensuring the availability and correct operation of a computer system without concern for the information stored or processed by the computer.

The term "communication" refers to any voice, text, and/or video electronic communication, such as a voice call, E-mail, instant message, text chat, VoIP call, and the like.

The terms "determine", "calculate" and "compute," and variations thereof, as used herein, are used interchangeably and include any type of methodology, process, mathematical operation or technique.

The term "driver" refers to logic (typically implemented as software) allowing a higher-level computer program to interact with a hardware device. A driver typically communicates with the device through a computer bus or communications subsystem to which the hardware connects. When a calling program invokes a routine in the driver, the driver issues commands to the device. Once the device sends data back to the driver, the driver may invoke routines in the original calling program.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "engine" refers to a program that performs a core or essential function for other programs. It is also used to describe a special-purpose program containing an algorithm that can sometimes be changed. For example, an engine can be a central or focal program in an operating system, subsystem, or application program that coordinates the overall operation of other programs. The best known usage is the term "search engine," which uses an algorithm to search an index of topics given a search argument. A search engine is designed so that its approach to searching the index can be changed to reflect new rules for finding and prioritizing matches in the index. In artificial intelligence, the program that uses rules of logic to derive output from a knowledge base is called an "inference engine."

The phrase "enterprise network" refers to a, typically geographically dispersed, computer network under the jurisdiction or control of one organization. It often includes several different types of networks and computer systems from different vendors.

The term "hyperlink" refers to a reference to a document that the reader can directly follow, or that is followed automatically. The reference points to a whole document or to a specific element within a document. Hypertext is text with hyperlinks. Such text is usually viewed with a computer. A hyperlink has an anchor, which is a location within a document from which the hyperlink can be followed; that document is known as its source document. The target of a hyperlink is the document, or location within a document, that the hyperlink leads to. The user can follow the link when its anchor is shown by activating it. Following has the effect of displaying its target, often with its context. In some hypertext, hyperlinks can be bidirectional; that is, they can be followed in two directions, so both points act as anchors and as targets. More complex arrangements exist, such as many-to-many links.

The term "information security" means protecting information and information systems from unauthorized access, use, disclosure, disruption, modification, perusal, inspection, recording or destruction.

The terms "instant message" and "instant messaging" refer to a form of real-time text communication between two or more people, typically based on typed text. The instant message is conveyed by an instant messaging program offered by a service, such as AOL™, MSN Messenger™, Yahoo! Messenger™, Live Messenger™, and Apple's iChat™ Generally included in the instant messaging software is the ability to see the presence of another party; that is, the ability to see whether a chosen friend, co-worker or other selected person (known as a "buddy"), is online and connected through the selected service. Instant messaging differs from ordinary e-mail in the immediacy of the message exchange and also makes a continued exchange simpler than sending e-mail back and forth. Instant messaging, unlike e-mail, is also generally stateless. Most exchanges are text-only, though some services now allow voice messaging, file sharing and even video chat (when both users have cameras). For instant messaging to work, both users must be online at the same time and the intended recipient must be willing to accept instant messages. An attempt to send an instant message to someone who is not online (or is offline), or who is not willing to accept instant messages, will result in a notification that the transmission cannot be completed. If the online software is set to accept instant messages, it alerts the recipient with a distinctive sound and provides a window that collectively indicates that an instant message has arrived. The window allows the recipient to accept or reject the incoming instant message. An instant message session is deemed to disconnect, or be disconnected, when the user goes offline, refuses to accept an instant message, or is suspended by the user failing to respond to an instant message after a predetermined period of time after an instant message is sent and/or received. An instant message session is deemed to be reconnected (or a call-back deemed to occur) when the user resumes the instant messaging session, such as by responding to an outstanding instant message.

The term "link" refers to a reference from one location to another location. The location can, for example, be an electronic address, a data storage address, a Universal Resource Locator, a Universal Resource Indicator, and the like. Common examples of links include hyperlinks.

The term "metaphor telephone" refers to a reference to a communication device that displays a metaphorical depiction of a selected object, such as a device capability, a communication medium, a virtual or geographic location, and the like. An example is where a telecommunication device richly displays a conference by each participating node's communication capabilities and limitations.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "presence information" refers to any information associated with a network node and/or endpoint device, such as a communication device, that is in turn associated with a person or identity. Presence information can indicate user status (e.g., online or offline), user availability (e.g., available, busy, on the phone, or out to lunch), user's desired contact means (e.g., instant messaging, circuit-switched telephone, packet-switched telephone, cell phone, pager, etc.) that may vary by contactor identity and/or contact time, and at what endpoint a contactor is most likely to reach successfully the presence service subscriber. Presence information can span a number of different communication channels. The aggregated view of a user's presence (that is, the availability across all of an individual's SIP-enabled devices) is called Multiple Points of Presence or MPOP. Examples of information useful in determining a user's presence and availability include information regarding the accessibility of the endpoint device, the recency of use of the endpoint device by the person, recency of authentication by the person to a network component, recency of registration of an endpoint device, an endpoint publishing presence information, SUBSCRIPTION requests generated by a user agent in the user's endpoint device, geographical location of the user using mobile device location information, scheduled activities on the user's calendar, indications whether or not a user has been reading or sending email, and an indication whether the user's email application has an out of office setting. Present information can be, for example, the electronic address of a device at which the service subscriber is currently deemed to be present and/or available.

The terms "online community", "e-community", or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chat rooms and forums that use voice, video text or avatars.

The term "security" refers to both information and computer security.

The term "Service Oriented Architecture" or "SOA" refers to a collection of services. These services communicate with each other. The communication can involve either simple data passing and/or two or more services coordinating some activity.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "subscriber" denotes an individual who normally is in a trust relationship with an enterprise allowing them to have access to, and interact within, the enterprise network and/or who normally receives some level of access to sensitive enterprise information, serviced via one or more communication media/modes provided and/or used by the enterprise, and requiring a trust relationship with the enterprise. Normally, a subscriber refers to a person having one or more communication devices controlled by an enterprise network. "Control" includes, without limitation, one or more of the actions of service by, registration with, and subscription with the enterprise network. Normally, a subscriber has a communication device located within a logical and/or physical trust boundary of the enterprise network. The trust boundary can be defined by one or more of a firewall, gateway, local area network definition and/or configuration, virtual private network definition and/or configuration, demilitarized zone, perimeter network definition and/or configuration, and the like.

The term "synchronized" means, in the context of databases, maintaining selected fields in the records of one database temporally up to date with respect to changes in the information stored, by the other database, in the selected or equivalent fields.

The term "token" or "tag" refers to a container of information that can be transmitted between computational nodes and/or can be associated with a set of information, such as a document, communication, file, link, application, sharepoint, blog, micro-blog, Really Simple Syndicated ("RSS") feed, and the like. Tags are typically a type of meta-data that is descriptive of selected information. Tags are normally in the form of an extensible markup language ("XML") or some other markup language.

The term "VoIP" refers to a family of transmission technologies for delivering packetized voice communications over IP networks such as the Internet or other packet-switched networks, rather than the public switched telephone network (PSTN). Other terms frequently encountered and synonymous with VoIP are IP telephony, Internet telephony, voice over broadband (VoBB), broadband telephony, and broadband phone. Common protocols for VoIP include H.323 and the Session Initiation Protocol.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 3 depicts a flow chart according to an embodiment;

DETAILED DESCRIPTION

Overview of System Architecture

Figure 1:
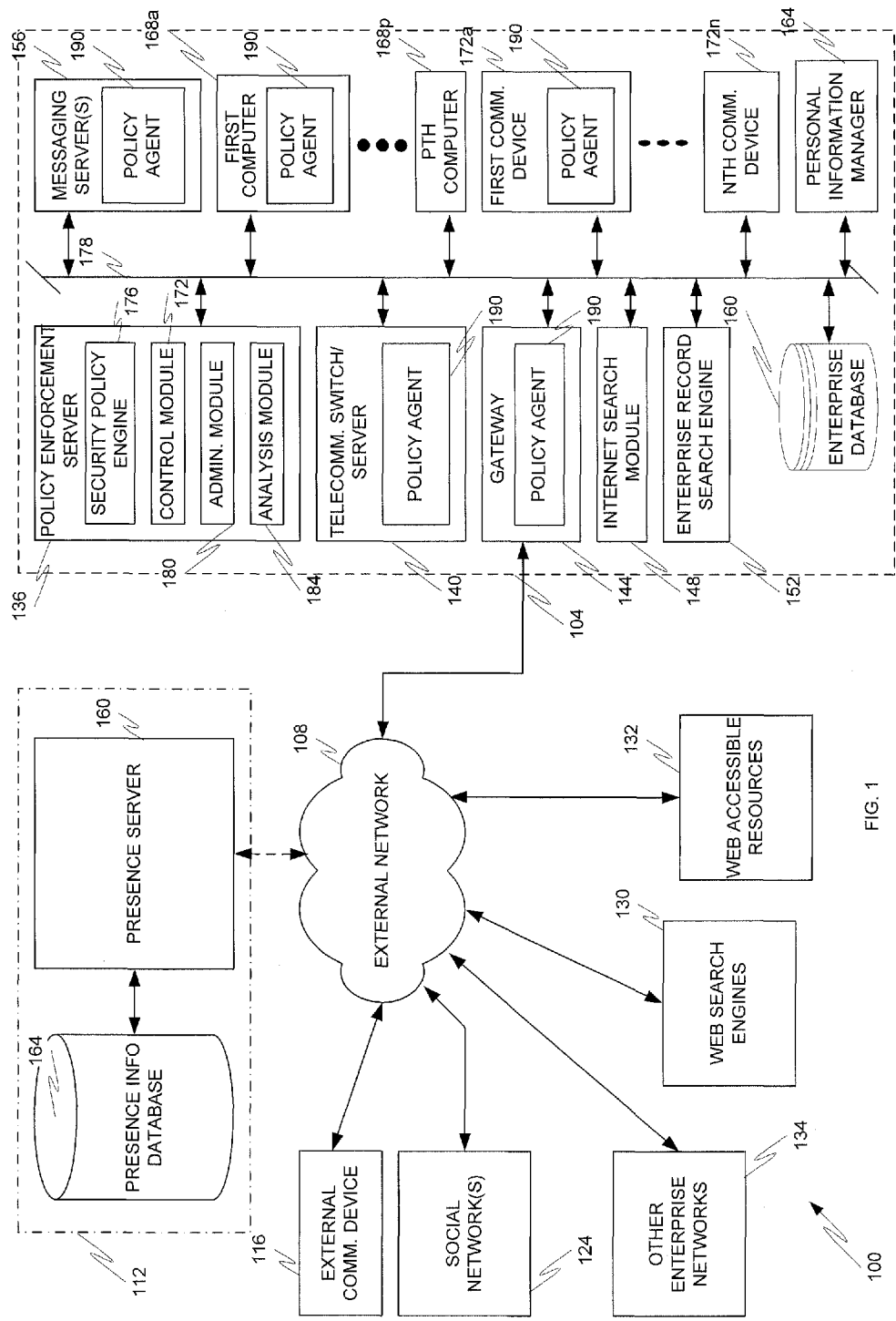
FIG. 1 is a block diagram of a network architecture according to an embodiment.

The disclosure, in various aspects, embodiments, and configurations, provides a system and method to perform a variety of operations discussed in more detail below. The various aspects, embodiments, and configurations relate to automated policy and/or rule creation, policy monitoring, tracking, and enforcement, and remediation of policy violations. In one aspect, a comprehensive communications security system orchestrates and coordinates a myriad of presently incompatible security methods and systems within a complex multi-media, multi-modal and/or multi-venue communications environment to secure a selected communication and/or content. More specifically a combination of specialized, highly intelligent, communications processors (such as the Avaya Aura Communications Manager™ and/or Avaya Aura Session Manager™), enterprise email applications (such as Microsoft Outlook™ or the like), other application specific messaging applications (such as Avaya Modular Messaging™) are tied together via an application and/or hardware to intelligently enforce overall communications security. Extensible mark up ("XML") languages in many forms are nearly a defacto standard for rationalizing dissimilar communications entities and protocols. When used in combination with the policy enforcement server, XML and its many variations can allow mixed vendor architectures, such as Avaya Aura™, to offer an overall security structure for all communications.

In one implementation, a policy enforcement server monitors, tracks, and reports system-wide communications, structures parties as being inside or outside of an enterprise network, allows multiple levels of other groupings, such as organizations, project teams, structural levels, security permissions, parties with a need to know certain information, and the like, receives input from external sources, such as on-line communities, social networks, presence services, and the like, to provide additional structural detail and other ad-hoc grouping or collaboration information, determines and analyzes communication security requirements regardless of the form of the selected communication, determines whether existing security measures or file protection protocols are adequate for the selected communication and/or content, determines an optimum network to effect transfer based on factors, including the security requirements for the selected communication and/or content, determines whether intended recipients are each permitted to receive the selected communication and/or content independent of whether the recipient is an individual or group member, compares the date, time and content of the selected communication against certain temporal factors that may act as gates for recipient access of the communication and/or content, considers the intended venue of the selected communication in permitting or blocking publication on the venue, intelligently creates policies and rules by observing system and user behavior, permits or enables sending of sensitive information to a party outside of a normal sphere of trust or enterprise network perimeter without extending firewall permissions or a persistent security application to the recipient, offers broadcast alerts to the members of a defined group in response to detected policy violations, links to other servers, application specific processors, messaging systems, storage and other such systems to coordinate security, intercepts and deletes or marks part of or all of a communication and/or content based on the policies, and/or flags areas of redundant and processor intensive encryption or security transcoding.

In security applications, a selected communication and/or content can take many forms, including, without limitation, a software application, electronic spreadsheet, electronic file, record, or document (e.g., word processing document, prior meeting notes, and the like), image, web link or page, sharepoint, blog, micro-blog, Really Simple Syndication ("RSS") feed, single- and/or multi-media communication (e.g., voice mails, e-mails, instant messages, and the like), communication histories, and other electronic forms of information.

A plurality of policy agents distributed throughout a plurality of enterprise network nodes, such as communication devices, firewalls, and gateways, application servers, track, define, and monitor user and/or system behavior. Such policy agents inspect and tag, for instance, communications and other content and provide the policy tags, optionally with the respective communication and/or content, to the policy enforcement server.

In one configuration, a policy agent features a compose mode, or alternatively a buffer, so that security feedback, such as policy violation warnings, encryption, change of format (security transcoding), and/or permissions, are provided. The policy agent can perform policy enforcement, such as buffering communications prior to transmission or connection while the policy enforcement server determines appropriate policy measure(s). Such capabilities have not previously been possible with real-time communications because of the normal dial plan. Some specialized secure phones and secure lines may have offered security capabilities, but this was not widely available to all members of a group particularly using generic and generally available hardware. With the introduction of devices with graphical dial metaphors, the ability to provide feedback or input prior to triggering the call or other communication session is now possible. Since such new graphical phones have more processing power than Plain Old Telephones ("POTs") phones, they are capable of being highly integrated with centralized telephony processors for features, coordination and collaboration. In contrast to conventional phones requiring specialized secure phones and lines, graphical dial metaphor phones are readily available to all members of a group or enterprise. In one configuration, policy agents are implemented in a driver, commonly in a class driver, to allow for this level of control. Class driver behavior can change based on communication with the policy enforcement server. This would allow context, content, and extended global address list to be involved in the filtering mechanism. For instance, the user interface could, in the event of a possible policy or rule violation, drop the message or warn the user.

The various aspects, embodiments, and configurations in this disclosure will be illustrated below in conjunction with an exemplary communication system. Although well suited for use with, e.g., a system using a server(s) and/or database(s), the present disclosure is not limited to use with any particular type of communication system or configuration of system elements. Those skilled in the art will recognize that the disclosed techniques may be used in any application in which it is desirable to collect and associate related and temporally changing multimedia information for presentation to a user.

FIG. 1 depicts a system 100 according to an embodiment. Referring to FIG. 1, an enterprise network 104 is in communication, via external network 108, with a presence service 112, one or more external communication device(s) 116, a social network 124, web search engine(s) 130, other enterprise networks 134, and other web-accessible resources 132.

External network 108 can be any type of external network, including, without limitation, circuit or packet-switched, public and untrusted, private or VPN-based, etc. The external network 108 is preferably a public packet-switched and/or circuit-switched network or set of networks. In one configuration, the external network 108 is a public network supporting the TCP/IP suite of protocols.

The presence service 112 includes a presence server 160 and an associated presence information database 164 that may or may not be operated by (or be external to) the enterprise network 104. The presence server 160 and presence information database 164 collectively track the presence and/or availability of presence service subscribers and/or their communication devices and provide, to requesting entities, current presence information respecting selected presence service subscribers. Presence may include physical location tracking of a person and/or the person's associated computational or communication device, such as by a satellite location system. Examples of satellite location systems include Global Positioning System ("GPS"), Compass Navigation System, and Galileo Positioning System. As will be appreciated, when the presence service 112 is external to the enterprise the presence service subscribers are different from the enterprise subscribers.

The external communication device(s) 116 can be any suitable circuit- or packet-switched or digital (e.g., TDM-enabled) communication device. Examples include wired and wireless telephones, cellular phones, Personal Digital Assistants or PDAs, Personal Computers or PCs, laptops, packet-based H.320 video phones and conferencing units, packet-based voice messaging and response units, peer-to-peer based communication devices, graphical dial metaphor telephones, and packet-based traditional computer telephony adjuncts.

The social network 124 can be any social internetworking service, including those defined above.

The web search engines 130 search for information on the external network 108, including information provided by web accessible resources 132. The information may consist of web pages, images, information and other types of files. Some search engines also mine data available in databases or open directories. Unlike web directories, which are maintained by human editors, search engines operate algorithmically or are a mixture of algorithmic and human input. Web search engines 130 typically operate through the sequential operations of web crawling, indexing, and searching. Exemplary search engines include Yahoo!™, Google™, Internet Explorer™, Bing™, Baidu™, AOL™, and Netscape™ search engines.

The web-accessible resources 132 refer to any indexed or otherwise searchable information or services available on the external network 108. Web-accessible resources 132 include information available on web pages, blogs, RSS feeds, and the like.

The other enterprise networks 134 can be proprietary networks of other enterprises and/or other geographically dislocated sub-networks of the same enterprise associated with the enterprise network 104.

The enterprise network 104 includes a policy enforcement server 136, a telecommunication switch or server 140, a gateway (which optionally includes firewall functionality) 144, an internet search module 148, an enterprise record search engine 152, messaging server(s) 156 (such as a (unified) messaging server, instant messaging server, email server, and the like), an enterprise database 160, a personal information manager 164, a plurality of first, second, . . . pth personal computers 168a-p, and a plurality of internal first, second, . . . nth communications devices 172a-n, interconnected by an (trusted or secure or private) internal network 178.

The policy enforcement server 136 monitors the behavior of the enterprise network 104 and enforces enterprise policies and rules. For example, policies and/or rules can define security rules, content security indications, compliance coordination, access permissions, and the like.

The telecommunications switch and/or server 140 can include a PBX, an enterprise switch, an enterprise server, or other type of telecommunications system switch or server. The communication server 140 is preferably configured to execute telecommunication applications such as the suite of MultiVantage™ or Aura™ applications of Avaya, Inc., including Communication Manager™, Aura Communication Manager™, Avaya IP Office™, and MultiVantage Express™. Included in the memory of the telecommunication switch and/or server 140 are call logs (not shown).

The (unified) messaging server 156 may provide features for integrating real-time voice, video and text communication services, such as instant messaging, chat, telephony (including IP telephony), and video conferencing, with non real-time communication services, such as voice mail, e-mail, SMS, and fax.

The personal information manager 164 contains, organizes and/or synchronizes subscriber personal information, such as contact information or address books, electronic calendars, personal notes, lists (e.g., task lists), reminders, text message archives, RSS/Atom feeds, alerts, and project management. An exemplary personal information manager 164 is Outlook™ by Microsoft, Inc. An electronic calendar, as will be appreciated, includes scheduled events indexed by date and time.

The first, second, . . . pth computers 168a-p can be any computational device, with personal computers and laptops being illustrative.

The first, second, . . . nth communication devices 172a-n can be similar to the external communication devices 116. In some embodiments, the communication devices 172a-n may be IP-enabled, SIP-enabled, digital, and/or analog devices. Examples of suitable modified IP telephones include the 1600™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videophone™) metaphor phones, and softphones of Avaya, Inc. Other types of suitable communication devices 172a-n include, without limitation, cellular phones, analog phones, digital phones, etc.

In the ensuing discussion, "enterprise communication node" refers to any node on the enterprise network 104, including without limitation the telecommunication switch and/or server 140, the gateway 144, the internet search module 148, the enterprise record search engine 152, the messaging server(s) 156, each of the first . . . pth computers 168a-p and/or first . . . nth communication devices 172a-n.

The enterprise database 160 includes enterprise subscriber information, such as name, job title, electronic address information (e.g., telephone number, email address, instant messaging handle, direct dial extension, and the like), subscriber contact lists (e.g., contact name and electronic address information), other employee records, search results, and the like. In one configuration, the enterprise database 160 is configured in accordance with the Lightweight Directory Access Protocol.

The internet search module 148 interfaces with a web search engine 130 to search social network(s) 124 and other web accessible resources 132 for instances of factors and events relating to policies and/or rules.

The enterprise record search engine 152 indexes and searches enterprise records and other information sources for instances of factors and events relating to policies and/or rules. Examples of enterprise-level and locally stored information sources include messaging server(s) 156, call logs, first . . . pth computers 168-*p*, first . . . nth communication devices 172*a-n*, enterprise database 160, and personal information manager 164. The enterprise record search engine 152 can be configured in a manner similar to a Web search engine. In other words, the enterprise record search engine 152 can store indexed information about multiple records by a Web crawler or spider-type module (for example, words are extracted from the titles, headings, or meta tags associated with the record). The searches are made against the index.

The Internet search module 148 and enterprise record search engine 152, for example, can search for and identify discrete communications that are part of a common thread involving one or more common communicants and/or communication devices and spanning multiple media and modalities, identify communications and/or other content related to a defined subject matter or topic and/or involving one or more selected individuals and/or communication devices, and identify other information relevant to one or more selected factor(s) and event(s).

The Policy Enforcement Server

Included in the memory of the policy enforcement server 136 is a security policy engine 176, a control module 172, an administrative module 180, and an analysis module 184.

The security policy engine 176 receives polices and/or rules from administrators, creates, defines, or generates policies and/or rules by intelligently (such as by a neural network) monitoring user, enterprise, and enterprise network behavior, and configures sets of expressions corresponding to the policies and/or rules. The set of expressions corresponding to a selected policy and/or rule defines the applicable factor(s) and/or event(s) to which the policy or rule applies and enumerates the corresponding action(s) to be taken upon detection of an instance of the factor(s) and/or event(s). The corresponding actions relate to one or more of policy or rule compliance and remediation of a policy or rule violation. Exemplary policies regard security to protect the confidentiality, integrity, authenticity, and/or availability of enterprise information, statutory and/or regulatory compliance (e.g., export or import restrictions), agreement compliance (e.g., compliance with the terms and conditions of the agreement), content security indications, compliance coordination, access permissions, and public or semi-public announcements.

A common type of enterprise policy and/or rule relates to security. Security policies and/or rules for defined information could be expressed in terms of authentication, access control lists (e.g., white lists, black lists, gray lists, etc.), the principle of least privilege, security classifications of persons and/or information (e.g., public, sensitive, private, confidential, unclassified, sensitive but unclassified, restricted, confidential, secret, and top secret), and cryptography requirements (e.g., message digests, digital signatures, non-repudiation, and encryption). Exemplary policies or rules include limits on presentation of the selected communication and/or content based on a virtual or spatial location of the user, user role, level or persona, and/or the particular communication node currently in use by the user. For instance, if the user is attempting to view business sensitive information in a public location, a use restriction would prevent or bar access to the information while the user is in the public location. In another example, if the user is attempting to view business sensitive information from his home computer, a use restriction would prevent or bar access to the information while the user is defined by his "at home" persona. In another example, a user permission would permit a plurality of members of a workgroup to access the selected communication and/or content.

The factors and events considered in applying security policies and/or rules include subscriber persona and/or role, other communicant(s) persona and/or role, degree of trust, subscriber and/or other communicant(s) device capabilities, provisioning, and preferences, subscriber device context, existing policy compliance measures, venue, subscriber and/or other communicant(s) context, content description, communication and/or content context, relevant policies and/or rules detected, recommendation/decision, and use restrictions and/or permissions. These factors are described in detail below.

The control module 172 applies the policy and rule expressions to detected instances of factors and events. In security applications for example, the control module 172 determines security requirements for selected content and/or communications and creates and updates policy tags appended to, embedded in, or otherwise associated with the selected content and/or communications. This determination includes for instance determining the adequacy of existing security measures, determining the desirable transport network for the selected communication, rationalizing (e.g., via policy and security transcoding) incompatible security schemes or measures, and coordinating security measures with other enterprise networks 134. The adequacy of existing security measures can be determined using a simple rules engine, a rules matrix listing rows and columns of security intercepts, and/or an artificially intelligent engine.

The administrative module 180 monitors, tracks, and reports system-wide communications, and receives from the control module 172, logs instances of, and sends notices of policy and/or rule violations to defined recipients. Exemplary recipients include the security policy engine 176 (for an artificially intelligent engine 176), subscribers, selected communication sender(s) and/or recipient(s) and content user(s) (whether subscribers or non-subscribers), and administrative and/or information technology personnel. In one configuration, the administrative module 180 tracks not only transmission history of communications but also transmission and user access history of attachments to communications, creation, edit, and/or access history of selected content. By way of illustration, the administrative module 180 and/or analysis module 184 would track the action of subscriber A (who has privilege to access a selected sensitive document) sending, by an email attachment, the sensitive document to equally privileged party B, who extracts the attachment from email and forwards it to unprivileged party C. In one configuration, the policy and/or rule violation notices are broadcast on one or more selected media (which can be different from the media subject to the violation). In one configuration, the administrative module 180 channels reports of suspected abuses and compliance issues to security personnel. In one configuration, the administrative module 180 logs an identifier or attribute of the selected communication and/or content, a respective timestamp associated with the inspection, analysis, and/or policy- or rule-based decision relating to the selected communication, and/or content, a rationale behind the policy- or rule-based decision or response to the selected communication and/or content, the nature of the policy- or rule-based decision or response to the selected communication and/or content, selected contents of the policy tag 300 and/or a pointer, link, or other reference to the relevant policy tag 300 and/or the selected communication and/or content. This information can through pattern-analysis and other known techniques identify subscribers repetitively violating a policy or rule so that corrective, punitive, or disciplinary action may be taken.

The analysis module 184 analyzes selected communications and content to identify predetermined factor and event instances, optionally identify potential policy and/or rule violations, optionally determine recommended policy or rule measures, and create and update policy tags appended to, embedded in, or otherwise associated with the selected content and/or communications. The analysis module 184 forwards the created or updated policy tag, and optionally the selected communication and/or content, to the control module 172 for application of policies and/or rules.

The Policy Agent

Included in the memories of various communication nodes are policy agents 190. Policy agents 190 monitor the activities performed by the corresponding communication node to identify instances of factors and events. For communication nodes, such as the gateway 144 and messaging servers 156, the policy agent 190 monitors the processing or handling of incoming and outgoing signals, particularly text and voice messages and voice signals. For communication nodes, such as first . . . pth computers 168a-p and first . . . nth communication devices 172a-n, the policy agent 190 monitors the operations of the interface between the user and the corresponding device and provides a compose mode for the selected communication and/or content. In the compose mode, the policy agent 190 monitors the subscriber composition (e.g., creation or edition) of a selected communication and/or content to monitor for policy and/or rule violations.

The monitored activities can be any selected activity related to a policy or rule, such as a communication with one or more other parties and preparation of a document. For example, the policy agent 190 can inspect email sent, instant messages sent, live voice communications sent, voice messages sent, documents reviewed, created, and/or edited, Web browsing sessions, and any other form of communication where content of the communication can be electronically discerned. The inspection can be performed using selected keywords or collections of keywords, each of which is associated with a predetermined area, topic, or subject matter, a selected symbol or set of symbols, value or set of values, character, and/or set of characters to identify a selected grammar, syntax, language, protocol, setting, feature, and/or application and/or subcomponent or function thereof, a selected set of parsing rules or logic to identify the context, content, and/or communication modality of a signal. In one configuration, the keywords may be selected by a user and/or enterprise.

Figure 2:
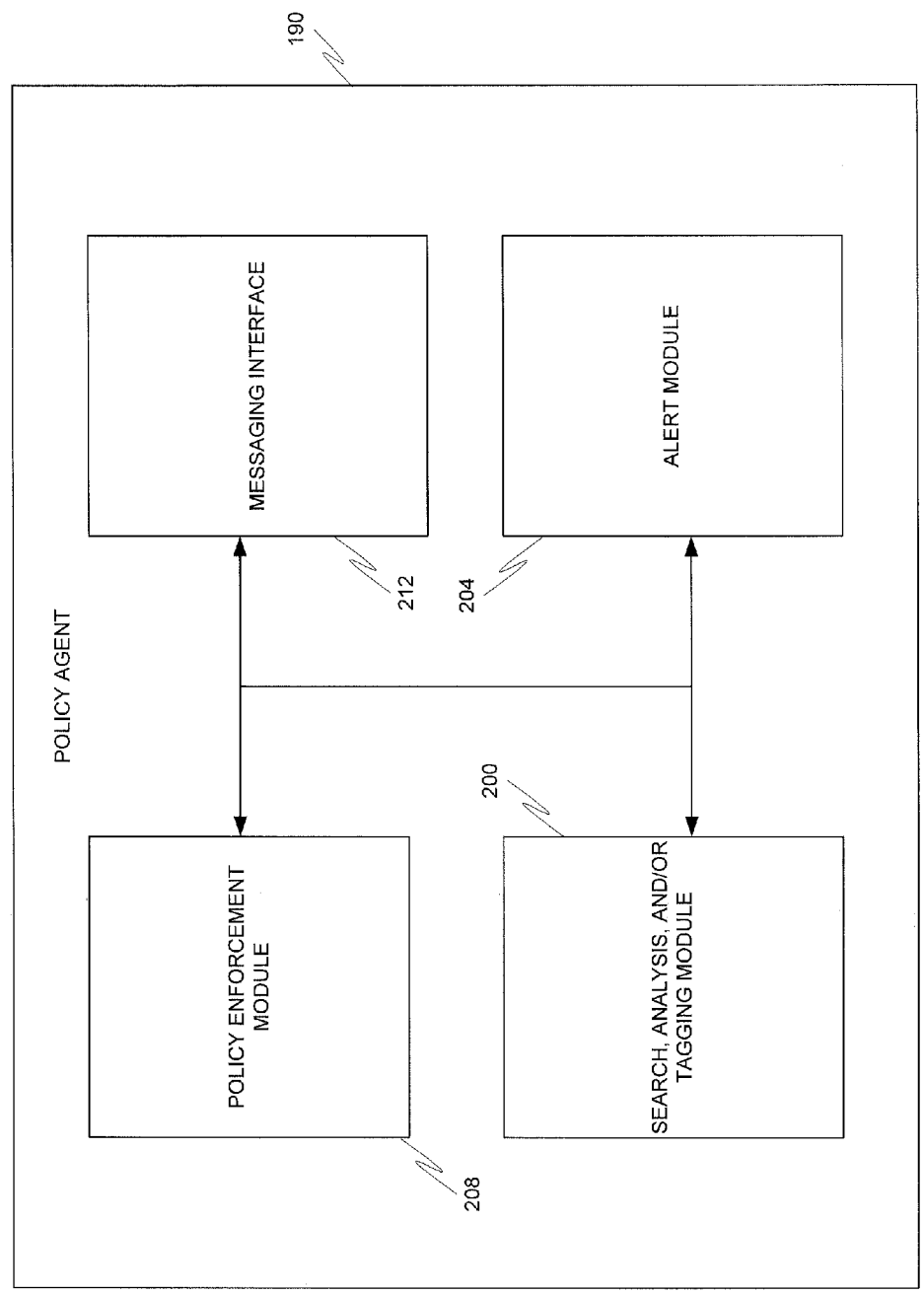
FIG. 2 depicts a policy agent according to an embodiment.

With reference to FIG. 2, a policy agent 190 includes a search, analysis, and/or tagging module 200 to search and analyze selected communications and content, track, at the device level, communications and selected content (including tracking communication threads and document versions), and generate policy tags containing the results, alert module 204 to generate and transmit notices, to the policy enforcement server 136 and other predetermined recipients, of policy and/or rule violations identified by the search, analysis, and/or tagging module 200 and/or the policy enforcement module 208, policy enforcement module 208 to receive and forward to the policy enforcement server 136 tagged communications and/or content, identify and notify the alert module 204 and/or policy enforcement server 176 of potential policy or rule violations, and receive and implement commands from the policy enforcement server 136, and messaging interface 212.

In response to identifying or receiving notification from the policy enforcement server 136 of occurrences or instances of predetermined factors and/or events, the policy agent 190 creates or updates policy tags and forwards the policy tags, alone or as part of the corresponding communication and/or content, to the analysis module 184 of the policy enforcement server 136. The predetermined factors and/or events include one or more of identification of applicable policy or rule, instance of policy or rule violation, existing policy compliance measure(s), content description, subscriber persona or role, other communicant(s) (whether sender(s) or recipient(s)) personal or role, degree of trust, subscriber and/or other communicant(s) communication device capabilities, provisioning, and preferences, venue for the selected communication and/or content, and communication and/or content context.

When intervention is required, the control module 172 forwards an intervention command to the policy enforcement module 208. Intervention commands include one or more of buffer the selected communication before transmission or connection, block access of the selected communication and/or content by negotiating different security measures with an internal or external device, redirect the selected communication to a different destination (such as administrative or information technology personnel), redirect the selected communication over a different communication modality, block transmission or access of the selected communication and/or content by all or a subset of potential recipients or users, reconfigure, redefine, and/or transcode security measures for the selected communication and/or content, provide a warning of a policy or rule violation, require encryption, require change of format (security transcoding), require, define or restrict permissions, and provide a visual or audible warning to the user of a potential policy or rule violation. As will be appreciated, transcoding refers to changing or converting format, encryption, or other security measures to satisfy the least common denominator of the various node capabilities along the transmission path or channel, including the communication endpoints.

In one configuration, the policy agent 190 analyzes the identified occurrences of factors and/or events and assigns, updates, and/or generates a level of confidence that the associated message or content is relevant to a policy or rule. The assigned level of confidence applied to the keyword occurrences can be based on a number of factors, including number or frequency of identified instances of the selected factor or event and the identities of the identified factors or events.

The policy agent 190 can be implemented in a variety of ways. For example, the policy agent 190 can be implemented as a thick-client software application, thin-client browser-based application, or other Web service-oriented application including voice-portal driven applications. It could be an embedded ability in an IP Hardphone or a pushed application to this type of communication device, such as in the form of a servlet or applet. It is envisioned that each of the subscriber-accessible application access methods will interact with Web server-based application(s) of the archival server components. The Web server-based applications are assumed to be accessible via standard HTTP protocols from any number of remote applications, with Common Gateway Interface (CGI) scripts necessary to read/write meta-data and archive files into the various repositories (or databases).

In one configuration, the policy agent 190 is located in the communication stack at the class driver level such that each instance of access to the internal or external network 178 or 108 necessarily passes through the policy agent 190. Since the class driver occurs before the information is packetized and since the policy agent 190 is on the system where the communication is being originated, there should be enough information to make the determination of whether or not the communication can occur based on context and content.

The policy enforcement server 136 locates and analyzes information at the enterprise network level while the policy agent 190 locates and analyzes information available locally. By way of example, the policy enforcement server 136, unlike the policy agent 190, proactively locates policy-related information not only in enterprise records but also available on the external network 108. While the search, analysis, and/or tagging module 200 accesses communications and content stored locally, the policy enforcement server 136 accesses policy tags 300, communications, and content available at multiple enterprise communication nodes. While the search, analysis, and/or tagging module 200 correlates factors, events, and information available locally, the policy enforcement server 136 correlates factors, events, and information available from multiple policy agents 190 in multiple enterprise communication nodes.

The Policy Tag

Figure 3:
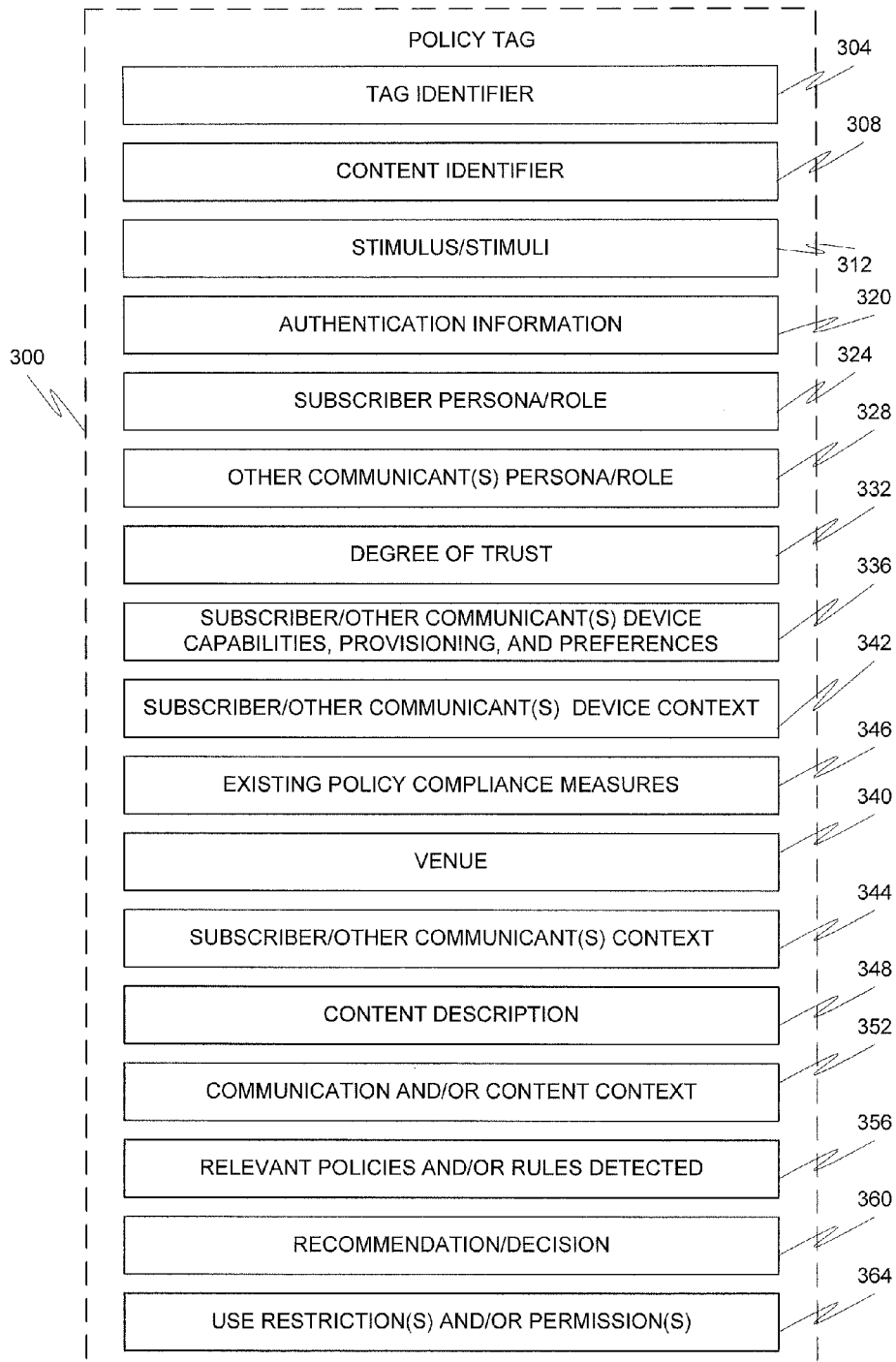
FIG. 3 depicts a tag according to an embodiment.

With reference to FIG. 3, a policy tag 300 is a portable container of policy-related information that is relevant to policy or rule compliance.

An illustrative policy tag 300 includes a number of sets of information, including tag identifier 304, content identifier 308, stimulus/stimuli 312, authentication information 320, subscriber persona and/or role 324, other communicant(s) persona and/or role 328, degree of trust 332, subscriber and/or other communicant(s) device capabilities, provisioning, and preferences 336, subscriber device context 342, existing policy compliance measures 346, venue 340, subscriber and/or other communicant(s) context 344, content description 348, communication and/or content context 352, relevant policies and/or rules detected 356, recommendation/decision 360, and use restrictions and/or permissions 364.

The tag identifier 304 can be any numeric, alphabetical, or alphanumeric identifier that identifies, uniquely, the respective policy tag 300. Examples of policy tag identifiers 304 include keyword, name, communication, message, or session identifier, file or directory name or extension, employee identifier, project name, electronic address, and the like. In one configuration, the policy tag identifier 304 is generated by a random or pseudorandom number generator.

The content identifier 308 can be any numeric, alphabetical, or alphanumeric identifier that identifies uniquely the corresponding communication, document, or other content. Examples of content identifiers 308 include a pointer, link, or other electronic memory address. In one configuration, the content identifier 308 is generated by a random or pseudorandom number generator. The content identifier 308 may or may not be the same identifier used for the policy tag identifier 304.

The stimulus/stimuli 312 refers to the stimulus or stimuli (including associated timestamp) causing policy tag 300 generation. Examples include incoming or outgoing message receipt, document creation, blog or micro-blog posting, receipt of RSS feed, file or record retrieval, web browsing session, and the like.

Authentication information 320 refers to the information that enables the policy enforcement server 136 to access a corresponding communication and/or content. Examples of authentication information 320 include credentials, such as usernames, log-in names, pins, and passwords, biometrics, digital certificates, security tokens, dongles, keys, social security numbers, driver license numbers, membership numbers, employee numbers, passport numbers, customer numbers, and other authentication and/or authorization attributes. The authentication information 320 is typically associated with the subscriber corresponding to respective communication and/or content. For example, the authentication information 320 can be a password to access a password-protected document or a log-in name and password to (re)initiate a session with an Internet site.

Subscriber persona(s) 324 refer to the various contextual profiles of the subscriber creator, originator, editor, recipient, and/or sender of the corresponding communication and/or content. Characterizing persona or role is complicated by the fact that the user may be making use of a plurality of fixed and mobile devices to conduct such activities. Although the subscriber normally refers to the enterprise subscriber associated with the enterprise communication node corresponding to the reporting policy agent 190, this field can include the person(s) or role(s) of other subscribers creating, originating, receiving, editing, or sending the corresponding communication and/or content. For example, a subscriber may conduct company business from home or alternatively need to conduct urgent personal business from work. The subscriber would thus have a "business profile" defined by business related information, such as employer name, user level, user organization, the subscriber's business-related electronic addresses (e.g., cellular phone number, desk phone number, e-mail address, instant message handle, and the like), satellite-based physical location coordinates associated with business location (current location can be determined, inter alia, by cellular phone location techniques), Web browsed URL's corresponding with business interests, times-of-day or days-of-week associated with business time, contact lists of business associates, clients, suppliers, customers, and/or other business-related contacts, and the like. The subscriber can also have a "personal (non-business) profile" defined by personal information, such as family member names, the subscriber's personal electronic addresses (e.g., cellular phone number, desk phone number, e-mail address, instant message handle, and the like), satellite-based physical location coordinates associated with personal (e.g., home or other residence) location, Web browsed URL's corresponding with personal interests, times-of-day or days-of-week associated with personal time, contact lists of friends, family members, hobby suppliers, charitable organizations and other volunteer activities, and/or other personal contacts, and the like. The personas and/or roles and their respective descriptions can be obtained from the enterprise network (such as from the enterprise record search engine 152), the Internet search module 148 by access of a profile of the communicant(s) available on a social network 124 or other web accessible resource 132, and/or the presence service 112 associated with the subscriber. For example, the policy enforcement server 136 can determine, via rich presence and persona detection, at least part of the time when enterprise or group business is being conducted. This can be accomplished when the telecommunication switch/server 140 is connected to the endpoint. When the endpoint is not part of the enterprise network 104 and uses a different presence service 112, the traffic would be sent through the enterprise network 104 so that the telecommunication switch/server 140 had access to the traffic to enforce the policies and rules.

The other communicant(s) persona and/or role 328 refer to the persona or role of other nonsubscriber creator, originator, editor(s), recipient(s), and/or sender(s) of the corresponding communication and/or content. The persona or role can be defined in any suitable manner, including the manner set forth above in connection with the subscriber personas(s) 324. This information may be obtained from the enterprise network 104 associated with the other communicant(s), the personal information manager 164 of the subscriber (which has a contact profile of the other communicant), the Internet search module 148 by access of a profile of the communicant(s) available on a social network 124 or other web accessible resource 132, or the presence service 112 associated with the other communicant(s).

The degree of trust 332 refers to the apparent degree of trust, and/or nature of trusted relationship (e.g., role of the person in the enterprise business operations), of the subscriber with each person or computational entity intended to have access to the selected communication and/or content. Such persons include the intended recipients, sender, originator, reviewer, editor, and the like. The degree of trust can be rated, quantified, or otherwise defined by the enterprise, such that each member of a trusted group has a respective, potentially different, degree of trust defined by the enterprise. Each trusted group can also have a respective degree of trust rating by the enterprise such that it can receive certain type of sensitive information but not other types.

A person can be a member of multiple groups. The group members can be identified by a universal identifier, such as a name, email address, instant message handle, and the like, which is portable among multiple devices and/or by an address of a specific communication device.

This field permits entities inside and/or outside the enterprise to structure parties as being either inside or outside the enterprise. This field can also enable multiple levels of other groupings, such as business organization (e.g., department and business entity), a project team, a board, a panel, a task group, a business team, business group, structural levels, security permissions, parties with a need to know certain information, and the like. The analysis module 184 can form trusted groups based on authoritative or trusted input from policy agents 190 within firewalls and gateways, virtual private network definitions or configurations, a local area network definition and/or configuration, demilitarized zone definition and/or configuration, perimeter network definition and/or configuration, an enterprise database 160 record, such as an electronic directory for phone numbers, an electronic directory for email, an electronic enterprise directory, and/or authoritative and/or trusted input from a back office application, such as Lightweight Directory Access Protocol ("LDAP"), Post, System Application and Products ("SAP"), a human resource record, such as an enterprise personnel record, a payroll system, security credentials from an internal or enterprise network source, an identity server, a white list and/or black list at the gateway 144, an access control list, an administrative setting, and any other such information that can be used to federate a complete picture of internal versus external identity. The grouping definitions can also or alternatively be based on input from social networks 124 (such as Linked In, Facebook, Twitter, and the like) that provide additional project structural detail and other ad-hoc grouping or collaboration information. With social media, one must determine whether the social network 124 is a trusted source, such as a corporate social network, or whether the social network 124 is a public social network where a determination of the reliability of the content must be made. Only information deemed to be authoritative is normally used. Any of the groupings listed above can also be additionally filtered on other fields in the policy tag 300, such as subscriber and/or other communicant(s) context 344, subscriber and/or other communicant(s) persona or role 324 or 328, content description 348, and the like.

Subscriber and other communicant(s) device capabilities, provisioning, and preferences 336 refer to any set of communication node capabilities, provisioned features, and user preferences. Device capabilities, provisioning, and preferences include, for example, screen size, CPUs, random access memory capacity, volatile memory capacity, nonvolatile memory capacity, total memory capacity, compatible and/or hosted communication applications, compatible and/or hosted communication clients, operating system, port configurations, wireless communication capabilities, compatible wired and wireless communication and data protocols, codecs and other security or encryption capabilities, bandwidth, voice capabilities, video capabilities, text capabilities, Web capabilities, and screen aspect ratio, icon positioning, data entry capabilities, removable storage, etc.

Subscriber and other communicant(s) device context 342 refers to a description of the current state, settings, features, and configuration of the device(s) receiving, sending, or otherwise having access to the selected communication and/or content.

Existing policy compliance measures 346 describes the measures currently in place, if any, for the selected communication and/or content to comply with the relevant policies and/or rules. This field includes a description of security measures currently in effect respecting the corresponding communication and/or content, such as logical controls (e.g., credentials (such as passwords), data encryption, and other cryptographic measures), and authentication techniques. This factor permits the policy enforcement server 136, for example, to determine whether an existing security system or file protection protocol is adequate for the selected communication and/or content.

The subscriber and other communicant(s) device capabilities, provisioning, and preferences 336, subscriber and other communicant(s) device context 342, and existing policy compliance measures 346 can be merged into fewer fields. Although the fields can contain the device capabilities, provisioning, preferences, and context of the devices of other subscribers and/or communicant(s) receiving, sending, or otherwise having access to the selected communication and/or content, it normally includes only the device capabilities, provisioning, and preferences of the device associated with the reporting policy agent 190. The analysis module 184 can populate the field with the capabilities, provisioning, and preferences of other subscriber devices or can simply append or embed or otherwise reference multiple policy tags in the selected communication and/or content.

The venue 340 refers to the degree of public exposure of the intended destination or recipient(s) of the selected communication and/or content. Examples of venue include the intended destination or recipient(s) of the selected communication and/or content is public, the intended destination or recipient(s) of the selected communication and/or content is private, blog, micro-blog, RSS feed, chat room, social network 124 posting, and news aggregator. The venue 340 impacts the appropriateness or desirability of sharing of the selected communication and/or content.

The subscriber and/or other communicant(s) context 344 is a description of the context of the subscriber and other communicant(s) receiving, sending, or otherwise having access to the selected communication and/or content. "Context" can be any indicator, attribute, or descriptor of a type and/or nature of an activity of a user, user level, a circumstance of the user, a surrounding of the user, and an environment of the user. Context includes, for example, presence of the subscriber, presence of the other communicant(s), physical, logical, and/or political (e.g., country) location of the subscriber, physical, logical, and/or political of the other communicant(s), application involved in the review, transmission, and creation and/or edition of the selected communication and/or content. If not already included in the selected communication and/or content, the subscriber and/or other communicant(s) context 344 can include the identities and/or addresses of the intended message recipients, and the identity and/or Universal Resource Locator ("URL") address (e.g., link or hyperlink) of a web accessible resource to receive the selected communication and/or content.

The content description 348 describes the selected communication and/or content, typically using symbols or characters referenced in one or more applicable policies and/or rules. The content description 348 can take many forms. For example, the content description 348 can include a key word or phrase or a set of key words or phrases, product code, serial number, communication identifier, session identifier, account number, project name or identifier, employee identifier(s), and team name or identifier. In one configuration, the policy tag is discrete from the selected communication and/or content and this field includes a pointer, indicator, reference, link or other type of electronic address to the selected communication and/or content. The content description 348 can also include, or track, the different versions of the selected communication and/or content using one or more policy tags 300. As will be appreciated, different versions of a document can have different levels of sensitivity, which would make it advantageous for each version to have a different tag as different policy or rule measures may be required.

The communication context 352 refers to or defines the context of the selected communication and/or content. The communication context 352 includes, without limitation, a communication mode or modality selected for transmission of the communication, timestamp associated with receipt, transmission, creation, and/or edition of the selected communication and/or content, the identities and/or addresses of the intended message recipients, and the identity and/or Universal Resource Locator ("URL") address (e.g., link or hyperlink) of a web accessible resource to receive the selected communication and/or content.

The relevant policies and/or rules detected 356 include a pointer, indicator, reference, or link to or other type of electronic address of the policies and/or rules potentially impacted by or controlling the selected communication and/or content. The field may further include an indication of whether or not the policy or rule has been violated and a timestamp(s) indicating each instance of policy or rule violation.

The recommendation and/or decision field 360 indicates a recommended action to be taken by the control module 172 and/or a control module 172 determined action to be taken in response to the selected communication and/or content. The field may also include a rationale or reason for the recommendation and/or decision. The recommendation or decision may be, for example, what measures to be taken to comply with the relevant policies and/or rules or what actions to be taken when a relevant policy or rule has been violated. In security applications, the recommendation or decision can include, by way of illustration, a command to a modify existing security measures for the selected communication and/or content, implement new or additional security measures for the selected communication and/or content, use a best network (which may differ from the network already indicated by the selected communication and/or content) to effect transmission or transfer of the selected communication and/or content or otherwise comply with necessary security requirements, implement an action to be taken to remedy a prior policy or rule violation, block, delay, or buffer the selected communication and/or content, mark or delete a portion of the selected communication and/or content prior to access by one or more other parties, send a notice of policy and/or rule violation to one or more selected destinations, embed a flag indicating an area of redundant and processor intensive encryption or security transcoding to information technology staff for process improvement, warn, discipline, and/or train the subscriber potentially violating or violating the policy and/or rule, prevent access of a selected communication and/or content by an unprivileged user, prevent the subscriber from selecting, such as by dragging and dropping, the selected content into a communication, provide read-only access to the selected communication and/or content, set a hop restriction on a selected communication and/or content so that, when the hop restriction is met or exceeded or a hop counter is incremented or decremented to a selected value, the selected communication and/or content is dropped or otherwise prohibited from delivery to the intended recipient, tear down a communication channel before transmission of the selected communication and/or content, redirect the selected communication to a different destination, display different portions of the selected communication and/or content to different recipients/users based on the degrees of trust or privileges of each such recipient or user, and successfully authenticate and/or validate the recipient(s) before access is permitted.

Use restriction(s) and/or permission(s) 364 refer to policy- or rule-based restriction(s) and/or permission(s) on the communication nodes privileged to receive all or portion of the policy tag 300. For example, while certain portions of the policy tag 300 may be accessed by a subscriber's computer 168 or communication device 172, other portions could be accessed only by the policy enforcement server 136 and/or specified administrative personnel. In this manner, an unprivileged subscriber or other user could not access sensitive portions of the policy tag 300 via a corresponding policy agent 190.

In other configurations, a policy tag 300 associated with a document incorporates the security provisions of the native system, such as a document control system, and carries the provisions along with the document as the document is used. For example, a user may have permission to access a document, but certain uses within the enterprise may be blocked by carrying the permission and security information along with the document. While the document example is an illustrative one, this can obviously be extended to other file, attachment or communications payload types. This could be done via some form of steganography which could be enforced either by the communications sub-system or the file sub-system.

EXAMPLES

To illustrate the operation of the policy enforcement server 136, policy agent 190, and policy tag 300, a number of examples will now be presented. The examples assume that the policy enforcement server 136 is a centralized intelligence (processor, multiple processors with a command structure, or equivalent) that coordinates overall communications security.

In a first example, the policy enforcement server 136 considers communication security requirements regardless of the form of the communication, for example, attachments, chat, email, IM, real time and packet voice, real time and packet video, embedded links, access to information on venues, access to tools and the like, because the policy and/or rule may regulate one or both of the fact that the communication is occurring and/or how the communication is occurring. This consideration is done based on the information sent in the selected communication and the network it is sent on. The policy tags 300 would describe what controls or security measures were previously deemed to be appropriate. The selected communication would be intercepted, inspected, and policy filtered by a policy agent 190 in an intervening or originating enterprise communication node. By way of illustration, a government policy or rule may permit an employee to communicate sensitive information by a secure voice channel but prohibit the employee from communicating the information by a text channel, such as email or instant messaging. In certain cases the intercept would be done in a low latency method that does not reveal, to those involved in the selected communication and/or content exchange, the inspection and policy filtering being done.

In a second example, the selected communication and/or content is multi-media, with each media presenting different security challenges. For example, the selected communication may include voice, text, and images to be analyzed by an intercepting policy agent 190. Automatic Speech Recognition combined with a lexicon of problematic keywords would translate the voice portion to equivalent text to enable the policy enforcement server 136 to identify potential policy and/or rule violations. This determination can be done by a policy agent 190 in real time or near real time speech communications.

In a third example, the policy agent 190 determines, based on the corresponding policy tag(s) 300, whether any or all of the selected communication and/or content and attachments thereto are encrypted, password, or otherwise security protected or have been compromised and optionally whether the encryption, authentication or security protection and/or protocol is in compliance with policies and/or rules. This determination can include, for instance, marking of files using simple mechanisms such as misspelled words in each copy to determine the source of a suspected leak. In one configuration, the existing security measures, such as encryption or authentication, are assigned a security rating to indicate a level or effectiveness of security. The rating can be based upon any suitable metric, such as security capabilities, encryption strength, security application version or identity, and/or mixtures thereof. This enables a mix of security measures to be compared to a benchmark threshold set forth in a policy or rule.

In a fourth example, the policy enforcement server 136, based on the corresponding policy tag(s) 300, determines and selects, based on policy or rule requirements, a best (transport) network and/or communication mode to effect transfer based on the communications and/or content security requirements. This assumes that a router has multiple paths or the selected communication and/or content can be sent by multiple communication modes, each with an attendant security cost or rating. This parameter would effectively allow the information to be transmitted on the correct communications channel based on the security requirements set forth in the policy or rule, the effective security of the channel, and trade-offs regarding other communications capabilities. For instance, the selection can be made by comparing a security cost and/or rating associated with a plurality of possible channels and/or communication modes against the policy or rule requirements to determine an optimal channel and/or communication node. A text message can be converted to voice and sent via a digital (circuit-switched) voice channel, sent via email, or sent via instant messaging. IP telephony can be extremely feature rich but may be considered as a sub-optimal choice for certain high sensitivity information where encrypted transmission over the Public Switched Telephone Network ("PSTN") could offer advantages. With an overall communications security control structure, it is possible to select a transport network based not only on cost, reliability, bandwidth and other known criteria but also on other policy tag 300 information, such as security requirements, the capabilities of the endpoints, and the communicating party identity, content and context.

In a fifth example, the policy enforcement server 136, based on the corresponding policy tag(s) 300, considers whether the audience is permitted to receive the communications or content independent of whether the audience is an individual or a group. The policy enforcement server 136 determines whether the intended recipient or proposed user access listing, whether an individual or group, is privileged, or trusted enough, to receive the selected communication and/or content. This can be done by a simple mapping operation in which the recipient or access list or description or attributes thereof is mapped against a permitted list or recipients or accessors or description or attributes thereof. If one or more members of the group is not privileged to receive or access the selected communication and/or content, transmission or access can be limited only to privileged members of the group or the transmission or access can be blocked for all group members except the originator/sender.

In a sixth example, the policy enforcement server 136 bases security requirements for a selected communication and/or content on a stimulus (e.g., time or event instance). The security requirement can be one or more of an authentication requirement to access the selected communication and/or content (e.g., whether authentication is required and what degree and/or type(s) of authentication is required), a limitation on potential recipients of the selected communication and/or content (e.g., whether a black list, white list, or access control list is required and, if required, the definition of the list), and a cryptography requirement (e.g., whether cryptography is required and, if so, the specific cryptographic requirement(s) (such as one or more of symmetric-key cryptography (such as block or stream ciphers), asymmetric-key cryptography (such as public-key cryptography), cryptographic hash function, message authentication code, cryptographic primitive, cryptosystem, and encryption level and/or strength). Other stimulus-triggered security requirements include the performance and/or nonperformance of any of the policy measures referenced elsewhere in this disclosure.

By way of illustration, the policy enforcement server 136 would compare the date, time and content of a communication against certain temporal factors that act as gates for transmission, dissemination, publication, or access of the selected communication and/or content. In a further illustration, the policy enforcement server 136 would remove security restrictions on the selected communication and/or content if it were located at a publicly accessible venue on the Internet. In other words, the degree of security, or security measures, are temporally- or event-based or dependent. Transmission, dissemination, publication, or access of the selected communication and/or content can be restricted or prevented until a temporal trigger, or date and time, or event occurs, after which the transmission, dissemination, publication, or access of the selected communication and/or content is subject to different (usually lesser) restrictions. By way of illustration, prior to a product's release date certain information about the product is maintained in confidence, and would be so maintained by the policy enforcement server 136, but after the product's release date the same information is no longer maintained in confidence and its dissemination and distribution would not be restricted by the policy enforcement server 136. In a further illustration, release of a user's guide prior to, but not after, the product availability announcement would be blocked. In these illustrations, project temporal information from project management applications, personal temporal information from scheduling applications, and the like, are tied together to determine when the release of certain information is either premature or timely.

In a seventh example, the policy enforcement server 136 would consider the intended venue of the selected communication and/or content and venue context as it impacts the appropriateness of communication and/or content sharing. The venue would be a function of many factors, such as the public accessibility of the venue and the trustworthiness of the transmission channel for the selected communication and/or content. By way of illustration, if a user compose mode is offered by the policy agent 190, the policy enforcement server 136 would consider content versus venue prior to allowing the information to be posted and, if necessary, prevent a subscriber from posting the selected communication and/or content on a social network 124 or other web accessible resource 132, such as a blog or micro-blog. This is superior to the use of web scrapers to detect a post that is not in an organization's best interests. The configuration of the policy agent 190 in a driver can be a highly effective enforcement mechanism in this example.

In an eighth example, the policy enforcement server 136, using a stimulus-based (e.g., temporally limited or event-based) definitions of trusted groups, conditionally sends sensitive information to a party outside of the normal sphere of trust (e.g., the enterprise premises) without (persistently) extending firewall permissions or a persistent security application to such a party or raises or lowers a security requirement associated with a selected communication and/or content. This assumes that the subscriber and/or enterprise already has a trusted relationship with the party, e.g., by virtue of a nondisclosure or confidentiality agreement or other agreement with the party. The definition of a trusted group, for instance, can be changed (e.g., limited, expanded, created, or disbanded) temporally to a specified date or time or be event- and/or topic-based, such as execution, termination, or expiration of an agreement or term or condition thereof, project, realization of a project goal, and the like. This operation merely extends a time-bound link to the party, with the expiration and/or deletion of information sent or available to the party. For example, both ends (or ending nodes) of the conditional extension could feature authentication, and encryption and would gate communications and content based on some pre-defined parameters at the time of set-up. A time and/or topic bound push of software is made to the partner. Once the topic is wound up or once a timer has expired, a heartbeat that has been keeping the security mechanism (software) open triggers an automatic delete function in the application software or otherwise disables the software. Other licensing-type mechanisms can be employed. The mechanisms would, for instance, require the software to request periodically the policy enforcement server 136 for permission to execute. When the respective trusted group member was no longer entitled to access the selected communication and/or content and therefore the software, the policy enforcement server 136 would deny permission to execute using security mechanisms known in licensing. As a result, one would not have to worry about administration of temporary virtual private network access and/or audits after the fact to remove access capabilities. There could be the ability to pre-maturely terminate such access, if associates working with the partner and/or security staff determine that there is a risk. This can be done using two security controllers to negotiate access control or by provisioning the remote partner in an extended global address list. The latter method would allow revocation more easily by controlling the expiration date of certain context as well as certain content.

In a ninth example, the policy enforcement server 136 broadcasts alerts to the members of a defined group when intrusive treats or malware inside or outside the firewall are detected and provides the alerts via the most effective mode and/or media. This can be done by integrating firewall intrusion detection access control systems into the control flow of the communications, such as by incorporating this type of system into a policy agent 190 in a firewall or gateway 144.

In a tenth example, the policy enforcement server 136 detects a malware or intrusive treat in an email. While it can send a broadcast notice or warning, by email, to the recipients that the identified email contains a malware or intrusive treat, the email may already be in the communication stack and such a warning would not notify timely the user. To avoid this problem, the policy enforcement server 136 can send the notice or warning by a different communication modality, transport network, and/or channel, such as voice mail, instant message, and the like. The decision on what communication modality, transport network, or channel to use can be determined based upon the presence of the potentially impacted users, the time zone differences between the physical locations of the impacted users, and the like. For instance, if a potentially impacted user is currently present on his or her digital voice phone and the virus, malware or treat was sent by email the policy enforcement server 136 can send by automated voice message or call the notice or warning to the desk phone. The notice or warning would describe the email by the header, such as by receipt time, send time, sender, recipient(s), regarding line, and the like. Alternatively, the email could be quarantined.

In a final example, the policy enforcement server 136 flags areas of redundant and processor intensive encryption, security transcoding, or other security measures to information technology staff for security measure improvement or modification. This could be implemented using policy agents 190 in each intermediate router and other node (such as the gateway 144 (or firewall) and telecommunication switch/server 140), and the endpoints. When substantive work is performed on the selected communication to transmit the communication, the tag is updated to reflect the nature of the substantive work. The tag could include a dedicated field for this purpose. The policy enforcement server 136 would review this field and make appropriate changes to the security measures to reduce the level of substantive work. Work could be described in a suitable terminology or metric, such as computational resource utilization (e.g., CPU, network bandwidth, and/or memory usage or requirements). The security improvement or modification could be by re-negotiation of the security measure(s) applied over all or part of the channel.

The above list of examples is not exhaustive or limiting. As will be appreciated, the system 100 discussed above can perform an endless variety of functions or activities, of which the above examples represent only a part.

As will be appreciated, any or all of these modules or data can be located alternatively, partially, or in combination, within the internal network 178, in memories of the first, second, . . . pth computers 168*a-p* and/or of the first, second, . . . nth communication devices 172*a-n* and, within the external network 108, on one or more nodes.

Operations of Policy Enforcement Server and Policy Agents

The operations of the policy enforcement server 136 and policy agents 190 will now be discussed with reference to FIGS. 4-7.

Figure 4:
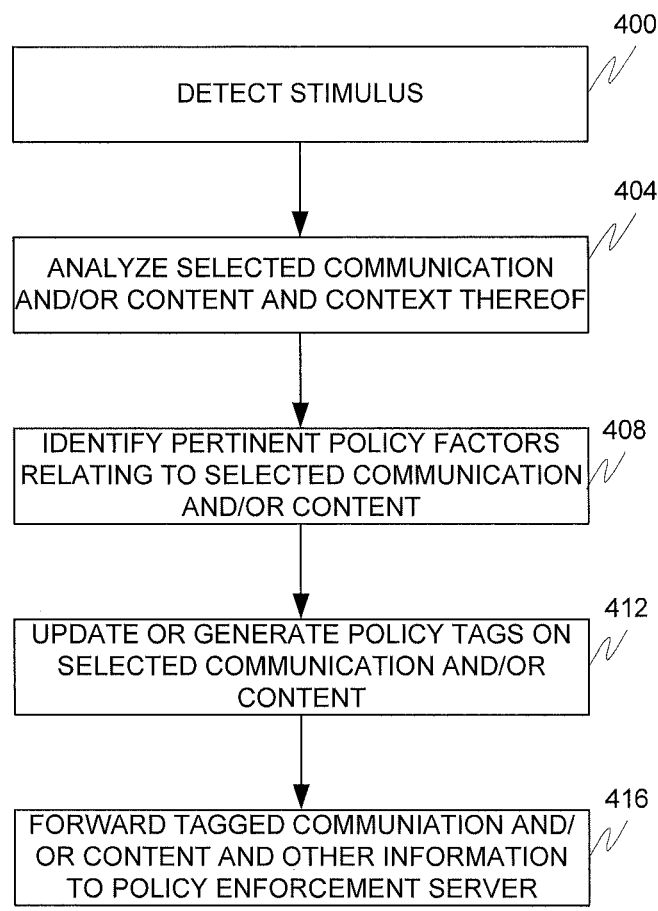
FIG. 4 depicts a flow chart according to an embodiment.

Referring to FIG. 4, the policy agent 190, in step 400, initiates operation upon detection of a stimulus, such as receipt or selection (attempted access or appendage) of an incoming communication and/or attachment thereto by a subscriber corresponding to the device containing the policy agent 190, creation or attempted transmission of an outgoing communication and/or attachment thereto by the subscriber, creation, modification, and/or selection (attempted access or appendage) of selected content, and the like.

In response, the search, analysis and/or tagging module 200 analyzes, in step 404, the selected communication and/or content and context thereof.

In step 408, the search, analysis and/or tagging module 200 identifies pertinent policy factors and metadata relating to the selected communication and/or content.

In step 412, the search, analysis and/or tagging module 200 updates and/or generates policy tags 300 for the selected communication and/or content.

In step 416, the search, analysis and/or tagging module 200 forwards, via the messaging interface 212, the tagged communication and/or content and other information to the policy enforcement server 136.

Figure 5:
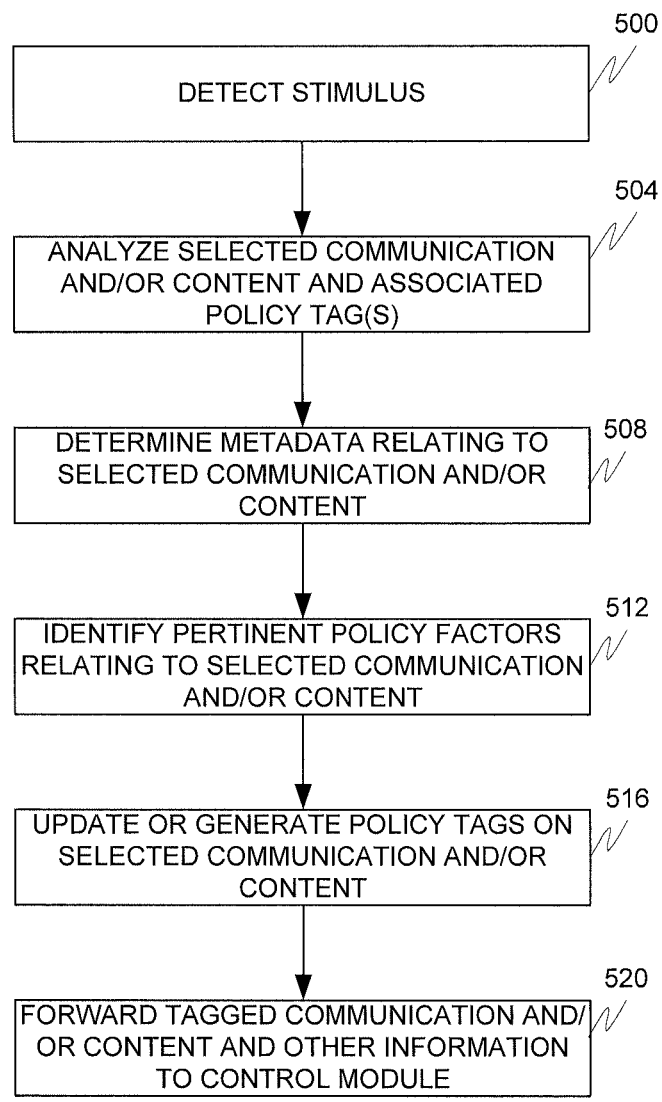
FIG. 5 depicts a flow chart according to an embodiment.

Referring to FIG. 5, the analysis module 184 in the policy enforcement server 136 receives the policy tagged communication and/or content and other information, which receipt is detection of the stimulus in step 500.

In step 504, the analysis module 184 analyzes the selected communication and/or content and appended policy tag 300.

In step 508, the analysis module 184 determines metadata relating to the selected communication and content.

In step 512, the analysis module 184 identifies pertinent policy factors relating to the selected communication and/or content. This step may further include a search by the analysis module 184 for other similar policy tagged communications or content by the same or other subscribers in the enterprise network 104.

In step 516, the analysis module 184 updates or generates policy tag(s) 300 on the selected communication and/or content.

In step 520, the analysis module 184 forwards the tagged communication and/or content and other information to the control module 172.

Figure 6:
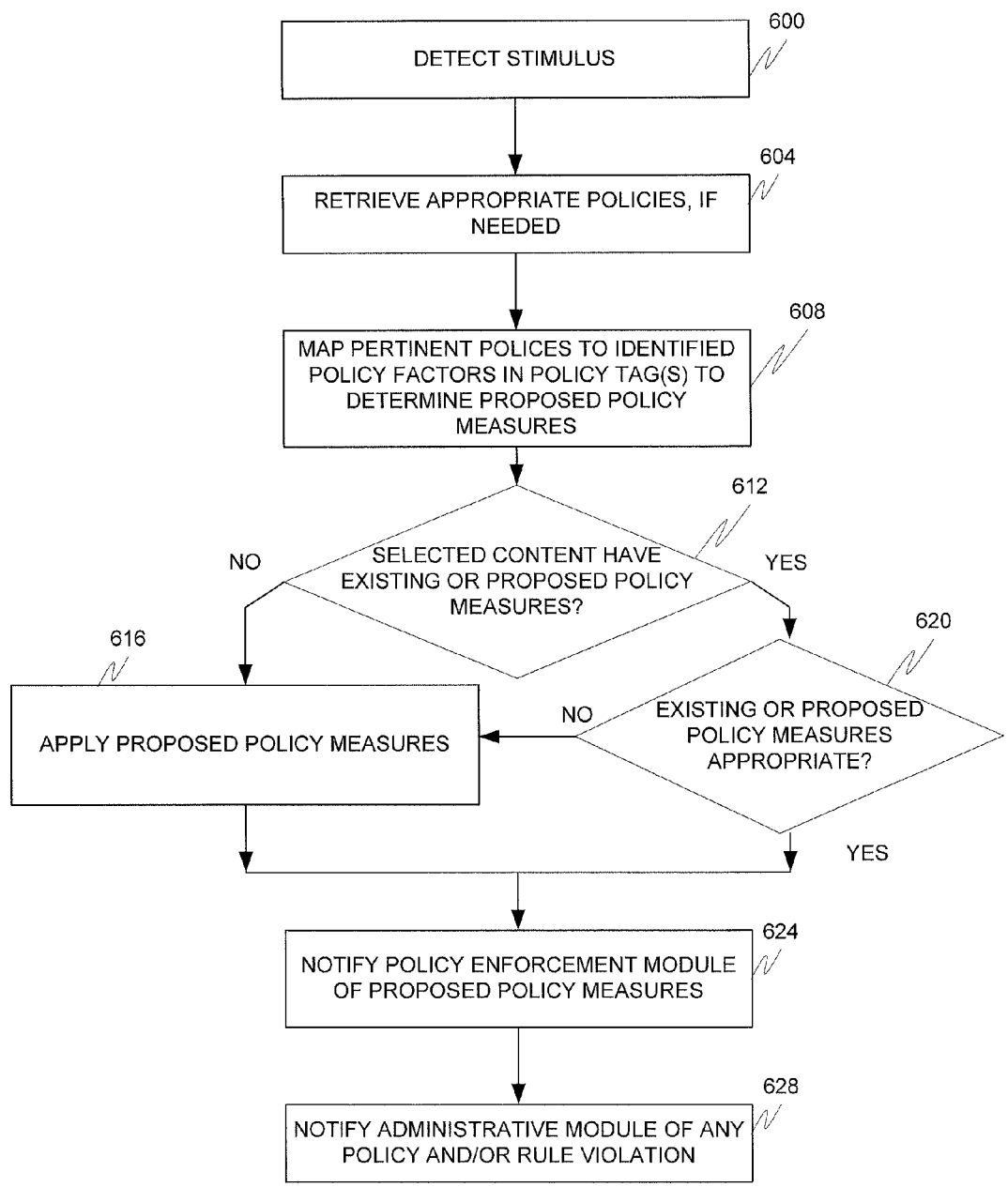
FIG. 6 depicts a flow chart according to an embodiment.

Referring to FIG. 6, the control module 172 receives the policy tagged communication and/or content and other information, which receipt is detection of the stimulus in step 600.

In step 604, the control module 172 retrieves from the security policy engine 176 the appropriate policies and rules, if needed.

In step 608, the control module 172 maps the pertinent policies and rules to identified policy factors in the policy tag(s) 300 to determine proposed policy measures. This step may further include a search by the control module 172 for other similar policy tagged communications or content by the same or other subscribers in the enterprise network 104 to investigate a behavioral pattern.

In decision diamond 612, the control module 172 determines whether the selected communication and/or content has an existing or proposed policy measure(s).

When the selected communication and/or content does not have an existing or user proposed policy measure, the control module 172, in step 616, applies policy measures proposed by the policy enforcement server 136.

When the selected communication and/or content does have an existing or user proposed policy measure, the control module 172, in decision diamond 620, determines whether the existing or user proposed policy measures are appropriate. If not, the control module 172 proceeds to step 616. If so, or after performance of step 616, the control module 172 proceeds to step 624.

In step 624, the control module 172 directly or indirectly notifies the policy enforcement module 208 in the reporting policy agent 190 of any proposed policy measure(s). In response, the policy enforcement module 208 implements the policy measure(s).

In step 628, the control module 172 notifies the administrative module 180 of any policy and/or rule violation.

Figure 7:
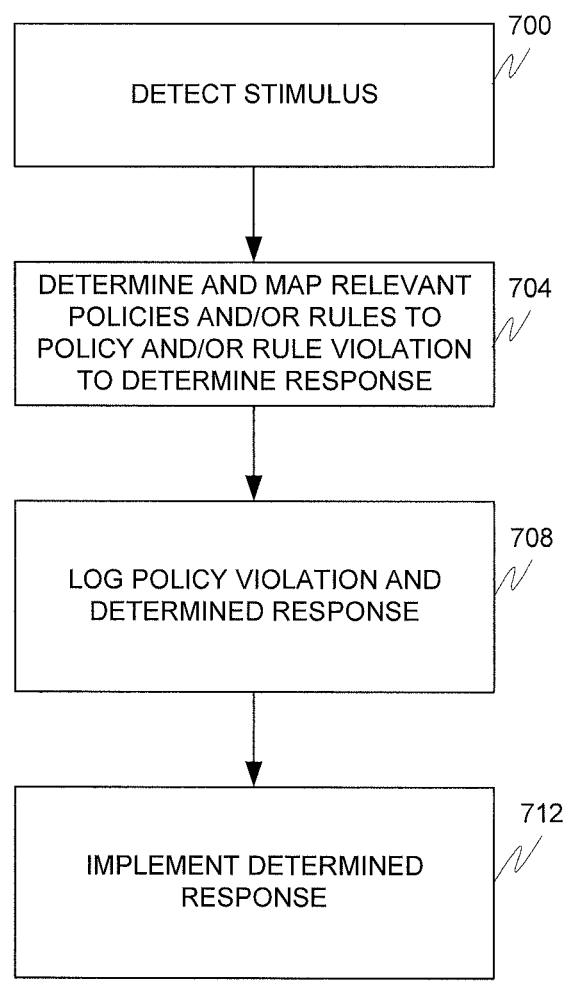
FIG. 7 depicts a flow chart according to an embodiment.

Referring to FIG. 7, the administrative module 180 receives the command from the control module 172, which receipt acts as the stimulus in step 700.

In step 704, the administrative module 180 determines and maps the relevant policies and/or rules to the policy and/or rule violation to determine a response.

In step 708, the administrative module 180 logs the policy violation and determined response.

In step 712, the administrative module 180 implements the determined response.

The exemplary systems and methods of this disclosure have been described in relation to a distributed processing network. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   receiving, by a hardware microprocessor, in a first communication session, existing media content from a communication device of a first subscriber, wherein the first subscriber has privileged access to the existing media content;
   analyzing, by the hardware microprocessor, the existing media content in the first communication session to identify a behavior of a second subscriber relevant to a policy or rule, wherein the second subscriber has privileged access to the existing media content, wherein the existing media content of the first communication session is accessed by a communication device of the second subscriber, wherein the behavior is the communication device of the second subscriber receiving input attempting to make the existing media content in the first communication session accessible to one or more communication devices of one or more selected other parties in another communication session, and wherein at least one of the one or more selected other parties does not have privileged access to the existing media content;
   notifying, by the hardware microprocessor, a policy enforcement server of the identified behavior; and
   receiving, by the hardware microprocessor, and from the policy enforcement server, a policy measure to be implemented; and
   implementing, by the hardware processor, the received policy measure, wherein the implemented received policy measure is to deny the input attempting to make the existing media content in the first communication session accessible to the communication device of the at least one of the one or more selected other parties who does not have privileged access to the existing media content.

2. The method of claim 1 further comprising:
   sending, by the hardware processor, a policy tag respecting the first communication session and the existing media content in the first communication session and wherein the policy tag comprises one or more of the following:
   a persona or role of the second subscriber,
   a persona or role of the one or more selected other parties,
   a degree of trust of an enterprise network with the second subscriber or the one or more selected other parties, wherein the degree of trust is a rating defined by an enterprise,
   a context of the second subscriber or the one or more selected other parties,
   a context of the second subscriber communication device or the one or more communication devices of one or more selected other parties,
   an existing policy compliance measure selected by the second subscriber communication device for the first communication session and the existing media content in the first communication session,
   a venue for the first communication session and the existing media content in the first communication session to be made accessible to the one or more communication devices of the one or more selected other parties,
   a description of the first communication session and the existing media content in the first communication session,
   a context of the first communication session or the existing media content in the first communication session, or
   a policy or rule relevant to the first communication session and the existing media content in the first communication session.

3. The method of claim 2, wherein the hardware microprocessor is in the second communication device, wherein the policy tag comprises one or more of a persona or role of the one or more selected other parties and a persona or role of the second subscriber, and wherein the persona or role is defined by one or more of the following: employer name, user level, user organization, the subscriber's business-related electronic addresses, satellite-based physical location coordinates associated with a business location, Web browsed Universal Resource Locator (URL)'s corresponding with business interests, times-of-day associated with business time, days-of-week associated with business time, contact lists of business associates, client, supplier, customer, family member name, the second subscriber's personal electronic addresses, satellite-based physical location coordinates associated with personal location, Web browsed URL's corresponding with personal interests, times-of-day associated with personal time, days-of-week associated with personal time, contact list of friends, hobby supplier, charitable organization, or other volunteer activity.

4. The method of claim 2, wherein the hardware microprocessor is in the second subscriber communication device, wherein the policy tag comprises the degree of trust of the enterprise network with the one or more selected other parties, and wherein the at least one of the one or more selected other parties is no longer trusted upon occurrence of a determined event or passage of determined time.

5. The method of claim 2, wherein the hardware processor is in the second subscriber communication device, and wherein the policy tag comprises one or more of the context of the second subscriber or the one or more selected other parties and the context of the second subscriber communication device or the one or more communication devices of the one or more selected other parties.

6. The method of claim 2, wherein the hardware microprocessor is in the second subscriber communication device, and wherein the existing policy compliance measure is selected by the second subscriber for the first communication session and the existing media content in the first communication session.

7. The method of claim 2, wherein the hardware microprocessor is in the second subscriber communication device, wherein the policy tag comprises a venue for the first communication session and the existing media content in the first communication session to be made accessible to the one or more selected other parties, and wherein the venue comprises one of a blog, micro-blog, Really Simple Syndication ("RSS") feed, chat room, social network posting, news aggregator, or private party.

8. The method of claim 2, wherein the policy measure to be implemented further comprises one or more of the following:
   modification of an existing security measure for the first communication session or the existing media content in the first communication session,
   implementation of a new or additional security measure for the first communication session or the existing media content in the first communication session,
   use of a different network path or channel than currently chosen to effect transmission or transfer of the first communication session or the existing media content in the first communication session,
   implementation of an action to remedy a prior policy or rule violation,
   block, delay, or buffer the first communication session or the existing media content in the first communication session,
   mark or delete a portion of the first communication session or the existing media content in the first communication session prior to access by the one or more selected other parties,
   send a notice of policy or rule violation to one or more selected destinations,
   embed a flag indicating an area of redundant and processor intensive encryption or security transcoding,
   prevent access of the first communication session or the existing media content in the first communication session by the one or more selected other parties,
   prevent the second subscriber from selecting, by dragging and dropping, selected existing media content into the first communication session,
   provide read-only access to the first communication session or the existing media content in the first communication session,
   set a hop restriction on the first communication session or the existing media content in the first communication session whereby, when the hop restriction is met or exceeded or a hop counter is incremented or decremented to a selected value, the first communication session or the existing media content in the first communication session is dropped or otherwise prohibited from delivery to an intended recipient,
   tear down a communication channel before transmission of the first communication session or the existing media content in the first communication session,
   redirect the first communication session or the existing media content in the first communication session to a different destination, or
   display different portions of the first communication session or the existing media content in the first communication session to different ones of the one or more of the selected other parties based on a respective degree of trust or privilege of each party.

9. The method of claim 8, wherein the policy measure to be implemented is to prevent the second subscriber from selecting, by dragging and dropping, the existing media content into the second communication session.

10. The method of claim 8, wherein the policy measure to be implemented is to set the hop restriction on the first communication session or the existing media content in the first communication session whereby, when the hop restriction is met or exceeded or a hop counter is incremented or decremented to a selected value, the first communication session or the existing media content in the first communication session is dropped or otherwise prohibited from delivery to the intended recipient.

11. The method of claim 2, wherein the venue is a blog, a micro blog, or a social network, and further comprising:
   determining the trustworthiness of the venue;
   in response to determining that the venue is not trustworthy, not allowing the second subscriber to post the existing media content in the first communication session onto the venue; and
   in response to determining that the venue is trustworthy, allowing the second subscriber to post the existing media content in the first communication session onto the venue.

12. The method of claim 1, further comprising:
   determining a date and time of the existing media content, wherein the date and time are in policy tags associated with the existing media content;
   determining if the date and time of the existing media content would remove security restrictions on the existing media content;
   in response to determining that the date and time of the existing media content removes the security restrictions on the existing media content, allowing the behavior;
   in response to determining that the date and time of the existing media content does not remove the security restrictions on the existing media content, determining if the existing media content in the first communication session is not to be located publicly;
   in response to determining that existing media content of the first communication session is not to be located publicly, not allowing the behavior; and
   in response to determining that the existing media content of the first communication is to be located publically, allowing the behavior.

13. A system, comprising:
   a hardware microprocessor; and
   a computer readable medium, coupled with the microprocessor and comprising microprocessor readable and executable instructions that cause the microprocessor to execute:
   a first policy agent, implemented in a driver and corresponding to a first node and a communication device of a second subscriber that:
      receives, in a first communication session, existing media content from a communication device of a first subscriber, wherein the first subscriber has privileged access to the existing media content, analyzes the first communication session and the existing media content in the first communication session to identify a behavior of the second subscriber relevant to a policy or rule, wherein the second subscriber has privileged access to the existing media content, wherein the existing media content in the first communication session is accessed by the second subscriber communication device, wherein the behavior is the communication device of the second subscriber receiving input attempting to make the existing media content in the first communication session accessible to one or more communication devices of one or more selected other parties in another communication session, and wherein at least one of the one or more selected other parties does not have privileged access to the existing media content;

notifies a policy enforcement server of the identified behavior; and implements a policy measure received from the policy enforcement server in response to the notification, wherein the implemented received policy measure is to deny the input attempting to make the existing media content in the first communication session accessible to the communication device of the at least one of the one or more selected other parties who does not have privileged access to the existing media content.

14. The system of claim 13, wherein the first policy agent sends a policy tag respecting the first communication session and the existing media content in the first communication session and wherein the policy tag comprises one or more of the following:

a persona or role of the second subscriber, a persona or role of the one or more selected other parties, a degree of trust of an enterprise network with the second subscriber or one or more selected other parties, wherein the degree of trust is a rating defined by an enterprise, a context of the second subscriber or the one or more selected other parties, a context of the second subscriber communication device or the one or more communication devices of the one or more selected other parties, an existing policy compliance measure selected by the second subscriber communication device for the first communication session and the existing media content in the first communication session, a venue for the first communication session and the existing media content in the first communication session to be made accessible to the one or more communication devices of the one or more selected other parties, a description of the first communication session and the existing media content in the first communication session, a context of the first communication session or the existing media content in the first communication session, or a policy or rule relevant to the first communication session and the existing media content in the first communication session.

15. The system of claim 14, wherein the first node is the second subscriber communication device, wherein the policy agent is in a class driver, wherein the policy tag comprises one or more of a persona or role of the one or more selected other parties and a persona or role of the first subscriber, and wherein the persona or role is defined by one or more of the following: employer name, user level, user organization, the subscriber's business-related electronic addresses, satellite-based physical location coordinates associated with a business location, Web browsed Universal Resource Locator (URL)'s corresponding with business interests, times-of-day associated with business time, days-of-week associated with business time, contact lists of business associates, client, supplier, customer, family member name, the first subscriber's personal electronic addresses, satellite-based physical location coordinates associated with personal location, Web browsed URL's corresponding with personal interests, times-of-day associated with personal time, days-of-week associated with personal time, contact list of friends, hobby supplier, charitable organization, or other volunteer activity.

16. The system of claim 14, wherein the first node is the second subscriber communication device, wherein the existing policy compliance measure is selected by the first subscriber for the first communication session and the existing media content in the first communication session.

17. The system of claim 14, wherein the first node is second subscriber communication device, wherein the policy agent is in a class driver, wherein the policy tag comprises a venue for the first communication session and the existing media content in the first communication session to be made accessible to the one or more selected other parties, and wherein the venue comprises one of a blog, micro-blog, Really Simple Syndication ("RSS") feed, chat room, social network posting, news aggregator, and private party.

18. The system of claim 14, wherein the policy measure to be implemented further comprises one or more of the following:

modification of an existing security measure for the first communication session or the existing media content in the first communication session, implementation of a new or additional security measure for the first communication session or the existing media content in the first communication session, use of a different network path or channel than currently chosen to effect transmission or transfer of the first communication session or the existing media content in the first communication session, implementation of an action to remedy a prior policy or rule violation, block, delay, or buffer the first communication session or the existing media content in the first communication session, mark or delete a portion of the first communication session or the existing media content in the first communication session prior to access by the one or more selected other parties, send a notice of policy or rule violation to one or more selected destinations, embed a flag indicating an area of redundant and processor intensive encryption or security transcoding, prevent access of the first communication session or the existing media content in the first communication session by the one or more selected other parties, prevent the first subscriber from selecting, by dragging and dropping, selected existing media content into the first communication session, provide read-only access to the first communication session or the existing media content in the first communication session, set a hop restriction on the first communication session or the existing media content in the first communication session whereby, when the hop restriction is met or exceeded or a hop counter is incremented or decremented to a selected value, the first communication session or the existing media content in the first communication session is dropped or otherwise prohibited from delivery to an intended recipient, tear down a communication channel before transmission of the first communication session or the existing media content in the first communication session, redirect the first communication session or the existing media content in the first communication session to a different destination, or display different portions of the first communication session or the existing media content in the first communication session to different ones of the one or more selected other parties based on a respective degree of trust or privilege of each party.

19. A communication node with a hardware microprocessor, comprising:

a policy agent, executed by the hardware microprocessor, in a class driver, that searches, analyzes, or tags a received first communication session and existing media content in the first communication session to identify an actual or potential policy or rule violation, wherein the first communication is with a communication device of a first subscriber, wherein the first subscriber has privileged access to the existing media content, reports the actual or potential policy or rule violation to a policy enforcement server, wherein the existing media content in the first communication session is accessed by a communication device of a second subscriber, wherein the violation is the second subscriber communication device receiving input attempting to make the existing media content in the first communication session accessible to one or more communication devices of one or more selected other parties in another communication session, and wherein at least one of the one or more selected other parties does not have privileged access to the existing media content, and implements a received policy measure is to deny the input attempting to make the existing media content in the first communication session accessible to the communication device of the at least one of the one or more selected other parties who does not have privileged access to the existing media content.

20. The node of claim 19, wherein the policy agent further implements a policy measure to address an actual or potential policy or rule violation and wherein the policy measure further comprises one of the following:

modification of an existing security measure for the first communication session or the existing media content in the first communication session, implementation of a new or additional security measure for the first communication session or the existing media content in the first communication session, use of a different network path or channel than currently chosen to effect transmission or transfer of the first communication session or the existing media content in the first communication session, block, delay, or buffer the first communication session or the existing media content in the first communication session, embed a flag indicating an area of redundant and processor intensive encryption or security transcoding, prevent access of the first communication session or the existing media content in the first communication session by one or more selected other parties, prevent the subscriber from selecting the one or more of the selected existing media content into a communication, provide read-only access to the first communication session or the existing media content in the first communication session, set a hop restriction on the first communication session or the existing media content in the first communication session whereby, when the hop restriction is met or exceeded or a hop counter is incremented or decremented to a selected value, the first communication session or the existing media content in the first communication session is dropped or otherwise prohibited from delivery to an intended recipient, tear down a communication channel before transmission of the first communication session or the existing media content in the first communication session, redirect the one or more of the first communication session or existing media content in the first communication session to a different destination, or display different portions of the first communication session or the existing media content in the first communication session to different selected other parties based on a respective degree of trust or privilege of each party.

* * * * *